(12) United States Patent
Türkmen et al.

(10) Patent No.: US 12,495,408 B2
(45) Date of Patent: Dec. 9, 2025

(54) ADAPTIVE FRAME SELECTION FOR SENSING AND JOINT SENSING AND COMMUNICATION APPLICATIONS

(71) Applicant: Vestel Elektronik Sanayi ve Ticaret A. S., Manisa (TR)

(72) Inventors: Halise Türkmen, Istanbul (TR); Mehmet Ali Aygül, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 344 days.

(21) Appl. No.: 18/272,869

(22) PCT Filed: Dec. 23, 2021

(86) PCT No.: PCT/EP2021/087600
§ 371 (c)(1),
(2) Date: Jul. 18, 2023

(87) PCT Pub. No.: WO2022/156997
PCT Pub. Date: Jul. 28, 2022

(65) Prior Publication Data
US 2024/0080832 A1   Mar. 7, 2024

(30) Foreign Application Priority Data
Jan. 19, 2021   (EP) .................................... 21152372

(51) Int. Cl.
*H04W 72/12* (2023.01)
*H04W 72/56* (2023.01)

(52) U.S. Cl.
CPC ........... *H04W 72/12* (2013.01); *H04W 72/56* (2023.01)

(58) Field of Classification Search
CPC .............................. H04W 72/12; H04W 72/56
See application file for complete search history.

(56) References Cited

U.S. PATENT DOCUMENTS 10,231,198 B2 * 3/2019 You ...................... H04W 48/12
2013/0086205 A1 4/2013 St. Clair et al.
(Continued)

FOREIGN PATENT DOCUMENTS

CN   109792732 A * 5/2019 ............ H04W 72/53
EP   1487150 A2   12/2004
(Continued)

OTHER PUBLICATIONS

Zhang et al., "Waveform Design For Joint Radar-Communication System With Multi-User Based On MIMO Radar", IEEE Radar Conference, 2017, pp. 415-418, Seattle, WA.
(Continued)

*Primary Examiner* — Saad A. Waqas
(74) *Attorney, Agent, or Firm* — The Webb Law Firm

(57) ABSTRACT

Some embodiments in the present disclosure relate to facilitating coexistence of communication applications and sensing applications in at least partially overlapping bandwidths. A sensing device, a joint sensing and communication device and/or a communication device are provided that transmit a request for transmission resources to a scheduling device in a communication format compliant with a communication standard. In response, the scheduling device allocates resources corresponding to a frame format compliant with a communication standard according to which the communication device operates, if the request was for a communication application or the scheduling device allocates resources corresponding to a frame format compliant with the communication standard or to a frame format suitable for a sensing application, if the request was for the sensing application. The selection of the frame format for the sensing application may further depend on the priority of the sensing application or further features of the application or environment or channel or the like. The wireless device
(Continued)

which receives the allocation schedules the signal transmission accordingly and may provide feedback to the scheduling device for adaptive frame format selection.

16 Claims, 9 Drawing Sheets

(56) References Cited

U.S. PATENT DOCUMENTS

| | | | |
|---|---|---|---|
| 2017/0177046 A1* | 6/2017 | Garg | G06F 1/3243 |
| 2019/0320446 A1* | 10/2019 | Li | H04W 72/543 |
| 2019/0335448 A1* | 10/2019 | Yang | H04W 72/51 |
| 2019/0342903 A1 | 11/2019 | Yu et al. | |
| 2020/0371220 A1 | 11/2020 | Eitan et al. | |

FOREIGN PATENT DOCUMENTS

| | | | | |
|---|---|---|---|---|
| GB | 2491230 A | * | 11/2012 | H04W 16/14 |
| JP | 2020507242 A | | 3/2020 | |
| WO | WO-2005079005 A1 | * | 8/2005 | H04W 16/14 |
| WO | 2018062301 A1 | | 4/2018 | |
| WO | WO-2022238975 A1 | * | 11/2022 | G01S 13/56 |

OTHER PUBLICATIONS

Chayat et al., "Support of high-resolution imaging sensors". 2020, IEEE 802.11-20/1758r0, (Vayyar), pp. 1-6.
Kasher et al., "Allowing Radar within Wireless LAN", 2018, IEEE P802.11, (Qualcomm), pp. 1-6.

* cited by examiner

ADAPTIVE FRAME SELECTION FOR SENSING AND JOINT SENSING AND COMMUNICATION APPLICATIONS

CROSS-REFERENCE TO RELATED APPLICATIONS

This application is the United States national phase of International Application No. PCT/EP2021/087600, filed Dec. 23, 2021, and claims priority to European Patent Application No. 21152372.5, filed Jan. 19, 2021, the disclosures of each of which are hereby incorporated by reference in their entireties.

BACKGROUND

Field

The present disclosure relates to co-existing wireless sensing and joint sensing and communication applications. In particular, the present disclosure provides methods and apparatuses for such wireless applications.

Technical Considerations

Wireless communication has been advancing over several decades now. Exemplary notable standards organizations comprise the 3rd Generation Partnership Project (3GPP) and IEEE 802.11, commonly referred to as Wi-Fi.

Flexibility and adaptivity have been desired since the beginning of wireless communication systems. For example, flexible signaling with link adaptation techniques (adaptive modulation and coding, and power control) has been aims in the second generation (2G) standardization of wireless cellular systems. Besides that, in Long Term Evolution (LTE)-Advanced (LTE-A) depending on the cell size, orthogonal frequency division multiplexing (OFDM) symbols are designed with either normal cyclic prefix (CP) or extended CP. Also, to support a wide variety of communication applications waveform flexibility is extended to additional parameters' flexibility such as subcarrier spacing in fifth generation (5G) standardization of New Radio (NR), where depending on the channel conditions and the communication service (enhanced mobile broadband (eMBB), massive machine type communications (mMTC), ultra-reliable low latency communications (URLLC)) required, the most suitable numerology is selected. Similarly, wireless local area network (WLAN) standards have incorporated radio environment maps to provide awareness of the radio environment network and have developed standards such as the 802.22 for cognitive radios (CR)s and European Telecommunications Standards Institute's (ETSI)'s re-configurable radio systems (RRS). Both of these standards bring flexibility and adaptivity to WLAN systems to improve communication performance in dynamic conditions.

SUMMARY

Methods and techniques, as well as the corresponding devices are described, facilitating coexistence of joint sensing and communication and sensing applications in at least partially overlapping bandwidth.

In some exemplary implementations, a method is provided for scheduling transmission of a wireless signal, the method comprising: receiving, in a frame according to a first frame format of a communication standard, request for scheduling a transmission of a signal by a wireless device, the request comprising an indication of whether the signal is a communication signal or a sensing signal, if the signal to be transmitted is a communication signal, allocating resources for transmission of the signal for a second frame format of a communication standard, and if the signal to be transmitted is a sensing signal, allocating resources for transmission of the signal for a third frame format which is different from the second format or for the second format, wherein a sensing signal bandwidth overlaps at least partially with the operation bandwidth of the communication standard.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" comprise plural referents unless the context clearly dictates otherwise.

BRIEF DESCRIPTION OF THE DRAWINGS

The terms Fig., Figs., Figure, and Figures are used interchangeably in the specification to refer to the corresponding figures in the drawings.

An understanding of the nature and advantages of various embodiments may be realized by reference to the following figures.

Figure 2:
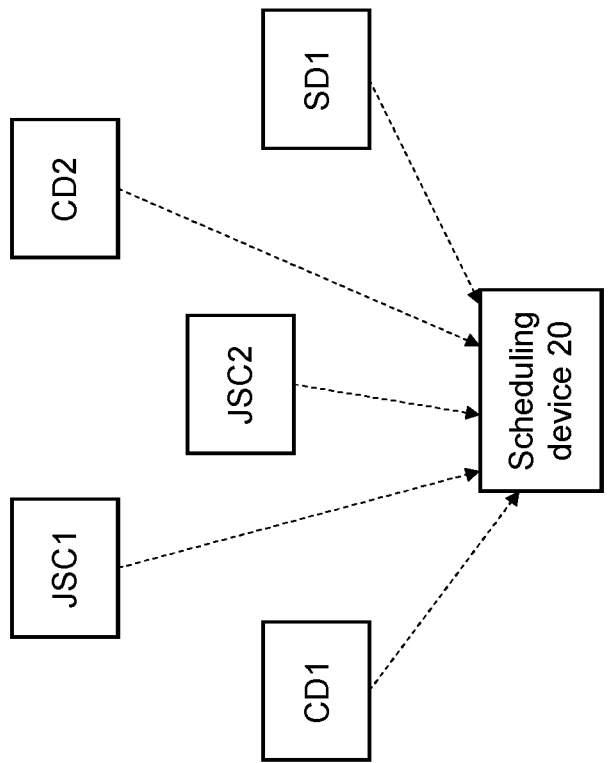
FIG. 2 is a block diagram illustrating a scheduling device with a plurality of wireless devices of various types.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

DESCRIPTION

No aspect, component, element, structure, act, step, function, instruction, and/or the like used herein should be construed as critical or essential unless explicitly described as such. Also, as used herein, the articles "a" and "an" are intended to comprise one or more items and may be used interchangeably with "one or more" and "at least one." Furthermore, as used herein, the term "set" is intended to comprise one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Figure 1:
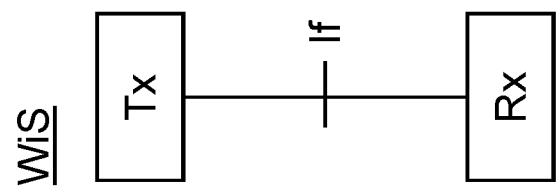
FIG. 1 is a block diagram illustrating a basic communication system.

FIG. 1 illustrates an exemplary wireless system WiS in which Tx represents a transmitter and Rx represents a receiver of wireless signal. The transmitter Tx is capable of transmitting a signal to the receiver Rx or to a group of receivers or to broadcast a signal over an interface If. The interface may be any wireless interface. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 1 may respectively also comprise the functionality of the Rx and Tx.

The present disclosure is not limited to any particular transmitter Tx, receiver Rx and/or interface If implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11be or the like. The wireless signal is not necessarily a communication signal in the sense that it does not necessarily carries out human or machine communication. It may be a sensing signal such as radar signal or sounding signal or any other kind of wireless signal.

The IEEE 802.11, commonly referred to as Wi-Fi, has been around for three decades and has become arguably one of the most popular wireless communication standards with billions of devices supporting more than half of the worldwide wireless traffic. The increasing user demands in terms of throughput, capacity, latency, spectrum, and power efficiency calls for updates or amendments to the standard to keep up with them. As such, Wi-Fi generally has a new amendment after every 5 years with its own characteristic features. In the earlier generations, the focus was primarily higher data rates, but with ever-increasing density of devices, area efficiency has become a major concern for Wi-Fi networks. Due to this issue, the last (802.11ax) and upcoming (802.11be) amendments have focused more on the efficiency issue.

In the future, there will likely be a wide variety of sensing applications and each application will have an optimum frame design and transmission mechanism. Additionally, these sensing applications will be integrated into communication frameworks, such as Wireless Fidelity (Wi-Fi) or NR or the like. Currently, there are no standardized frame designs or transmission mechanisms to support these sensing applications or to support joint sensing and communication (JSC) applications. It seems not feasible to have one design to address all of the requirements for different sensing applications and JSC applications. Different sensing applications may require different performance and quality of service metrics. Similarly, different JSC frame designs and transmission mechanisms can satisfy the different quality of service metrics, such as range resolution, accuracy, or throughput. Changing channel and environment conditions also greatly affects the performance of sensing. Therefore, a single framework containing different frame designs and transmission mechanisms and the selection of an appropriate frame design and transmission mechanism may be desirable. Such framework should comprise flexible and adaptive transmission design and frame structure. Future wireless networks will likely contain an abundance of devices performing wireless sensing, either as a sole function or along with communication to improve communication-related performance or enhance communication-related applications.

In other words, wireless sensing will likely have an abundance of applications in future wireless networks. These applications will range in domains from improving wireless communication performance, enabling applications such as fully immersive extended reality, improving quality of life by enabling smart environments, improving health-related applications through non-invasive tests and vital signs monitoring, and the like. Therefore, future environments are expected to host a wide variety of wireless sensing device and their applications. These devices must coexist with the current wireless communication devices and maintain their sensing performance. Like in 5G, where each communication service (eMBB, mMTC, URLLC) has different resource requirements and satisfy the different quality of service (QoS) metrics, sensing applications also have different performance requirements, and therefore, will have different resource requirements. These requirements may also change with the changes in the environment and spectrum. Due to device/technology accessibility, wireless sensing has been studied using WLAN devices. The 802.11bf task group study group is an amendment to Wi-Fi 7 and is expected to be completed in time for the Wi-Fi 7 release. Additionally, 5G and Wi-Fi have significant coordination and cooperation, as 5G opportunistically uses Wi-Fi spectrum, more than the previous generations. This, combined with the sixth generation (6G) visions mentioned above, indicates that wireless sensing will be a part of future cellular standards as well.

According to an embodiment, a method is provided for scheduling transmission of a wireless signal. The scheduling may be performed by a scheduling device 20, as shown for example in FIG. 2.

The method comprises, at the side of the scheduling device 20, receiving a request for scheduling a transmission of a signal by a wireless device. The wireless device may be a communication device, a sensing device, or a JSC device. FIG. 2 shows a plurality of various devices to request resources for signal transmission from the scheduling device 20. In particular, the plurality of devices comprises communication devices CD1 and CD2, JSC devices JSC1 and JSC2, as well as a sensing device SD1. In general, a communication device is a device configured to run an application which makes use of wireless communication, such as a communication according to a wireless standard.

Sensing devices have wireless sensing functionality. They are configured to run a sensing application. These devices may be also configurable or configured to perform wireless communication to transmit their sensed measurements, which is typically a small amount of data compared to amounts of data transmitted by usual communication applications or devices. In the sensing, measurements are taken as the parameters (features) which can be extracted from the wireless signal received, whether directly or after some processing. Some non-limiting examples of measured parameters comprise received signal strength indicator (RSSI), channel state information (CSI), range, velocity, or the like.

JSC devices are configured to run both the communication application(s) or the sensing application(s). For example, the main function of the JSC devices may be communication, meaning they may have a large amount of data to transmit, but they can perform wireless sensing as well, to improve communication performance or for a user application, such as navigation, or the like.

Some non-limiting examples of sensing devices comprise smart bands, non-invasive medical sensors, such as heart rate monitors, body mass monitors, or the like. Non-limiting examples of applications supported (implemented) by JSC devices comprise object tracking and/or user tracking for beam management, physical layer security through physical user (human) identification, or the like. Non-limiting exemplary devices comprise cellphones, laptops, tablets, access points (APs), or the like.

In FIG. 2, the scheduling device 20 received resource request (also denoted as scheduling request) from the plurality of devices CD1, CD2, JSC1, JSC2, and SD1. The request comprises an indication of whether the signal to be transmitted is a communication signal or a sensing signal. Such indication may be explicit or derivable from one or more parameters. For instance, a request from a sensing device or a sensing application of a device may be interpreted as request for transmitting a sensing signal. Similarly, a request from a communication device or a communication application or a device may be interpreted as request for transmitting a communication signal.

In an exemplary implementation, the resource request is transmitted in a frame according to a first frame format of a communication standard. Such communication standard may be one of the wireless communication standards such as Wi-Fi standards or global communication standards such as 3GPP standards or the like. However, the communication standard may also be a standard specifically designed to facilitate communication and/or resource management or scheduling for devices supporting different standards. It may be advantageous if the first frame format is supported by all kinds of devices (communication, sensing, JSC) and by any kind of application (sensing, communication).

The scheduling device 20 then decides, for the received request, which frame format and, possibly, which transmission parameters shall the requesting wireless device apply and allocates the resources accordingly. The decision by the scheduler may be performed according to any known scheduling strategies. For example, the scheduling device 20 may take into account the current occupancy of the resources it controls, traffic load in the cell (managed area), number of devices requesting transmission, channel quality, environment, device types, application types, priority of the applications scheduled and to be scheduled, or the like.

For example, if the signal to be transmitted (to be scheduled) is a communication signal, the scheduling device 20 allocates resources for transmission of the signal for a second frame format of a communication standard. The second frame format may be same as the first frame format. However, the formats may also differ. In particular, the communications systems used for transmitting the first frame format and the second frame format may differ, too. However, they may be also the same.

If the signal to be transmitted (to be scheduled) is a sensing signal, the scheduling device 20 allocates resources for transmission of the signal for a third frame format which is different from the second format or for the second format. Thus, the sensing signal may be scheduled within a communication frame or within a frame more suitable for the sensing application, e.g. a sensing frame. The sensing frame may follow a frame format (third format) of a sensing standard or may just be constituted directly by the sensing signal, without any additional signal structure.

The adaptive frame format selection for the scheduling of the frame may facilitate a more efficient coexistence when a sensing signal bandwidth overlaps at least partially with the operation bandwidth of the communication standard.

In some embodiments, the sensing signal is a continuous or periodic radar signal. In some embodiments, the sensing signal is a signal generated by a sensing application supporting wireless sensing, wireless local area sensing, and/or non-invasive medical sensing.

In general, wireless sensing is performed by measuring some features of a received signal. On the other hand, communication is performed by detecting from the received signal information encoded therein at the transmitter. In communication, some features of the received signal are used to perform the detection (such as demodulation and decoding).

There are numerous frame designs, waveforms, and transmission schemes that are being used for wireless sensing and JSC. Their use depends on the method of wireless sensing that is being used. For example, wireless sensing may be done in one of the following ways:

Wireless fingerprinting: Measurements are taken, either at different locations or with a stationary sensor, while different actions are taking place. These measurements may be processed and stored beforehand in a look-up table with their respective locations/actions. These measurements may be one or a combination of RSSI, CSI, SNR, or the like. Environment factors may affect wireless fingerprinting performance are the complexity (Multi-room, LOS, NLOS, clutter, obstructions, etc.) of the environment (which is directly related to the multipath and small scale fading), mobility, or the like. Spectrum conditions which may affect wireless fingerprinting performance is the interference.

Radar-based sensing: Sensing signals are transmitted with a certain rate and duty cycle and the reflections of these signals are processed to learn information about the object, such as its range, size, relative velocity, material, etc. In radar applications, waveforms or frame designs with high auto-correlation properties and low peak to average power ratio (PAPR), due to high transmit powers and very low receive powers) are preferred. Common waveforms are pulse waveforms or frequency modulated continuous wave waveforms. Frame design and transmission mechanism based factors which may affect radar performance are the transmit power, duty cycle, pulse repetition frequency, frequency modulation, carrier frequency, auto-correlation properties, bandwidth, signal period, angle of departure, beamwidth, beam sweep rate, or the like. Environment factors which may affect radar performance are the amount of clutter, physical properties of the object (size, material, etc.), location of the object, atmospheric conditions (e.g.: humidity), or the like. Spectrum conditions which may affect the radar performance are the occupancy, number of users, interference, channel conditions (time/frequency selective), or the like.

Pattern-based sensing: This is similar to wireless fingerprinting, except that the measurements are not pre-stored in a look-up table, but rather a pattern is extracted from them, which represents the action/object to be detected, and the pattern is used to detect the action/object in future measurements. Example frame designs and waveforms are the physical protocol data unit (PPDU) packet in Wi-Fi and OFDM and orthogonal time frequency space (OTFS) waveforms. Frame design and transmission mechanism-related factors which may affect the performance of sensing are the sensing/training/pilot sequence, placement of these sequences (in which subcarriers), bandwidth, carrier frequency, packet length, packet repetition frequency, angle of departure, beamwidth, beam sweep rate, RF impairments, or the like. Environment-related factors which may affect the sensing performance are a number of mobile objects in the area (environment stationarity), a number of users/objects to be detected, nature of the motion/action/activity to be detected (large/small displacement, slow/fast-moving or the like), atmospheric conditions, physical properties of the object/user to be detected, or the like. Spectrum conditions which may affect the radar performance are the occupancy, number of users, interference, channel conditions (time/frequency selective), or the like.

In general, the present disclosure is not limited to the above-mentioned three types of sensing.

The features of the received signal measured by the wireless sensing may comprise, but are not limited to, time-of-flight, RSSI, CSI, or the like. Transmitted signal parameters affecting the performance of the wireless sensing are, but not limited to, the transmitted frequency, bandwidth, waveform, power, training or sensing sequence, auto-correlation capabilities, pilots, beam angle and width (if beamforming is taking place), duty cycle, transmission rate, or the like.

Some exemplary and non-limiting wireless sensing performance metrics comprise maximum/minimum range, range resolution, range accuracy, maximum/minimum velocity, velocity resolution, velocity accuracy, number of separable objects (separable in range and velocity), minimum detectable object separation, angle of arrival accuracy, or the like. For the network performance, the additional network load incurred due to sensing is also an important metric.

Wireless sensing has been prevalently studied in the Wi-Fi bands such as 2.5 gigahertz (GHz), 5 GHz, and above 60 GHz. As such, there may be interference to and from other Wi-Fi devices, and opportunistic cellular devices. Wireless communication may require varying levels of security, throughput, and latency. However, possible interference from sensing devices may reduce wireless communication performance. In order to mitigate this, JSC signals or waveforms can be used. As a result, there may be a number of combinations of frame designs, waveforms, and transmission mechanisms, which can be used to satisfy both communication and sensing.

It is desired that wireless sensing, communication, and JSC devices operate/coexist peacefully in the same (or at least partially overlapping) frequency bands with a maximum efficiency, in terms of spectrum usage, power, or the like, and sensing and communication performance, in terms of throughput, reliability, sensing accuracy, or the like. This may not be effectively feasible with a single fixed frame design and the transmission mechanism. All design and mechanisms have their own advantages and drawbacks. At the same time, the sensing, communication, or JSC requirements can be highly dynamic, based on the application performance feedback. Therefore, an adaptive and flexible frame design and transmission mechanism selection framework may be advantageous.

Some embodiments of the present disclosure relate to such adaptive frame design and transmission mechanism selection for joint sensing and communication system(s). Future wireless networks may contain an abundance of devices performing wireless sensing along with communication, either jointly or as a sole function. Wireless sensing capabilities typically rely on the signal design and transmission mechanism. The transmitted signal should also be able to satisfy the communication needs of the device if there are any. Sensing and communication requirements vary for different devices and applications. A single fixed frame, signal, or mechanism design may be insufficient to satisfy the different requirements of devices/applications. Therefore, a different variety of designs integrated into a single framework is desirable.

According to some embodiments of the present disclosure, the suitable frame structure and transmission mechanism are assigned to a signal based in the sensing, joint sensing, and communication requirements and/or based on changing environment conditions. The frame and transmission mechanism design is changed depending on the sensing or communication function priority and possibly other criteria, such as the sensing application requirements, the environment conditions, network traffic, spectrum occupancy, or the like.

As exemplified above, the scheduling may be performed for transmission of the wireless (sensing or communication) signal from the wireless device to the scheduling device or to other devices. For instance, the scheduling may be done for communication signal in uplink or for transmission between two or more wireless devices. The scheduling for a sensing signal may be performed for the sensing itself (e.g. for radar signal). Alternatively, or in addition, the scheduling of the sensing signal (application) may be performed for communicating the sensing results to another wireless device or to the scheduling device. The scheduling may be for communicating the sensing results to a plurality of devices by broadcasting/multicasting.

In general, when referring herein to a sensing signal, what is meant is a signal generated by a sensing application. This may be the sensing signal itself (such as radar impulse or continuing signal) or signal of the sensing application reporting the sensing results (such as environment condition, medical parameter status, or the like) or a communication signal (also) used for sensing. Similarly, the communication signal refers to a signal which may comprise communication payload and/or control data.

In an exemplary implementation, whether the resources for transmitting the sensing signal are allocated for the third frame format or for the second frame format depends on at least one of: a priority of the sensing signal, traffic load in the bandwidth, channel quality in the bandwidth, or spectrum occupancy. In addition or alternatively, the third format is determined from one or more of a plurality of predefined frame formats based on at least one of: a priority of the sensing signal, traffic load in the bandwidth, channel quality in the bandwidth, or spectrum occupancy. In general, it is beneficial when the frame format for the sensing signal (sensing application) is selected taking into account the type of application (sensing application or communication application) and, possibly in addition, further knowledge about the signal to be transmitted such as its priority or channel conditions.

According to an exemplary implementation, the scheduling method further comprises a step of determining a priority of the sensing signal to correspond to a priority of a sensing application, which generated the sensing signal. In particular, the determining comprises obtaining the priority of the sensing application based on at least one of: an identity of the device on which the sensing application is executed; an identity of the sensing application; or quality of service requirements of the sensing application. The priority may be also distinguishable for a single application, e.g., according to the deployment of the application. For example, a surveillance application may have different priority depending on the surveilled object. Such priority may be set in the sensing application which may provide some interface (such as user interface) to perform the setting (configuration). It may be communicated to the scheduling device by the wireless device to perform the sensing.

In an exemplary embodiment, the priority is determined by a module trained based on machine learning. For example, the scheduling device comprises such trained module. The trained module may be any machine learning or deep learning module. The input of the trained module may be a set of parameters and the output may be a priority. For example, the set of parameters may comprise the above mentioned parameters such as device identity and/or device type, quality of service requirements (such as latency and/or error rate), deployment of the application, location of the device, and/or the like. The module may be specifically trained for such input parameters to output an appropriate priority. Appropriate here refers to suitability of the priority levels to match the relative importance of different signals to be transmitted. In an exemplary non-limiting implementation, two wireless sensing application devices are provided, one which monitors a heart rate and the other monitoring sleeping. In the case of just these two applications, the heart monitoring application would have precedence. However, if there were multiple wireless devices with various different applications, the priority may be more difficult to determine. In such a case, the aforementioned set of parameters can be used to train a machine and determine the priorities.

In general, communication will likely be one of the most important functions of wireless devices. On the other hand, with the development of human health and safety-related wireless sensors, sensing functionality has also gained importance. Therefore, methods which enable their coexistence may provide some advantages for both the communication applications and the sensing applications. In situations where their peaceful coexistence is not possible, one may have priority over the other. Prioritizing some communication types over other communication types has been present, for example, in the 802.11e standard, which assigns a higher priority to real-time applications such as voice and video communication over other kinds of communications by allowing them a shorter back-off periods and longer transmission periods. This aims at reducing latency, which may be incurred during real-time voice or video communications. On the other hand, there may be scenarios where sensing may take priority over communication. In such scenarios, the sensing should be allocated better resources. For example, health monitoring using wireless sensors in some scenarios cannot be stopped, and therefore should have priority at least over some latency tolerant communication services. Thus, the frame design and transmission mechanism parameters in some embodiments of the present disclosure are adaptively designed or chosen depending on whether the application is employing a solely sensing, solely communication, or a frame and transmission mechanism with both communication and sensing functionality.

Figure 3:
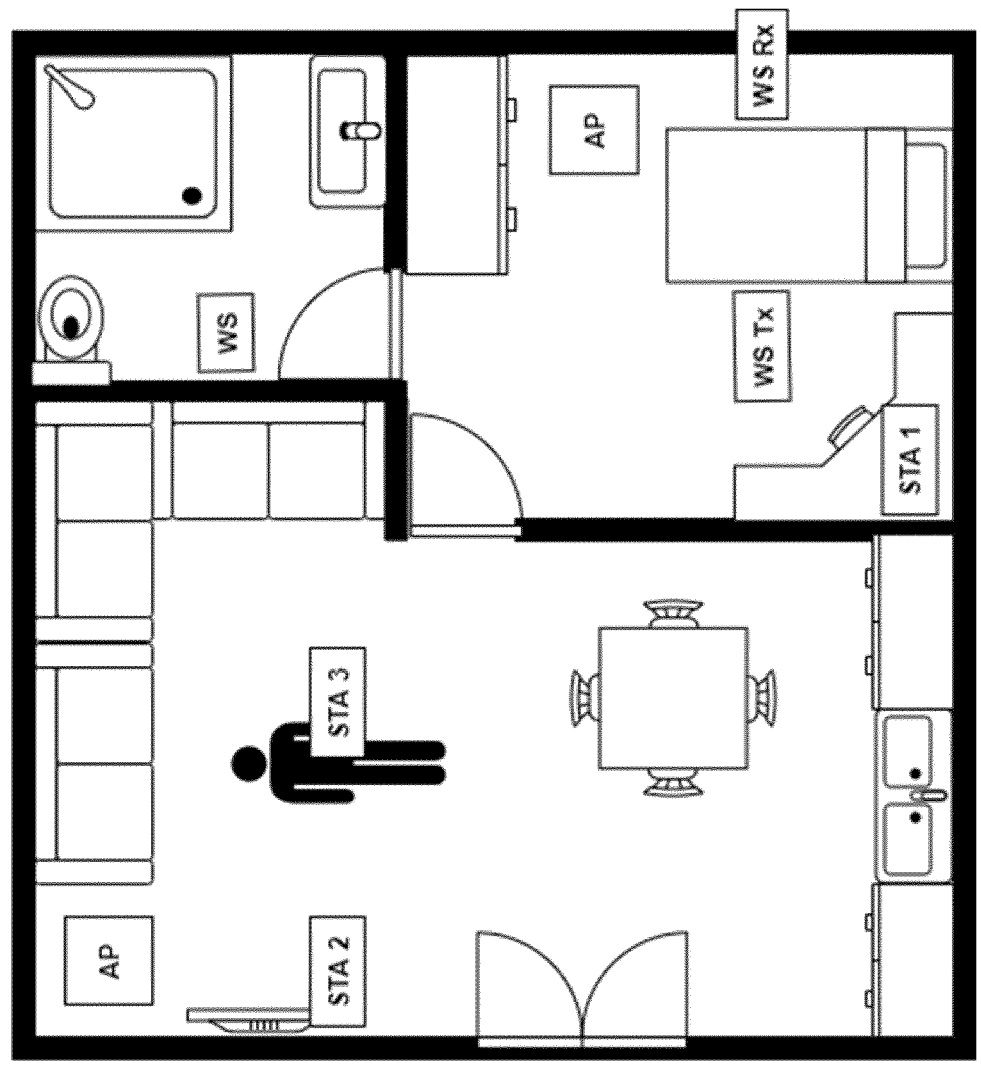
FIG. 3 is a schematic drawing illustrating an environment in which multiple communication, sensing and joint sensing and communication devices may be active.

FIG. 3 illustrates an exemplary environment which is a home environment, comprising various different wireless devices. In this example, there are two access points AP in different rooms of an apartment, and a plurality of wireless devices comprising devices STA1, STA2, STA3 communicating over WLAN. These may be, e.g., smartphones, laptops, tablets, and/or other devices. The plurality of devices further comprises wireless sensors WS, which may be sensors only transmitting signal, sensors receiving signal, or sensor which does both transmitting and receiving signal. Correspondingly, the scheduling may be performed for any of such devices to transmit (and/or receive) signals. Depending on the location and range of the wireless device, the channel quality may vary. Also, the channel quality may vary with the interference caused by the devices which may (try to) transmit/receive signals at the same time.

In the case of the frame format and transmission mechanism with both communication and sensing functionality, one of the following may be selected, depending on the requirements (which may be reflected by priority or a set of parameters as mentioned above):

A design, which serves both communication and sensing applications to satisfy their respective performance/quality requirements.

A design, which serves sensing with a better performance (quality of service) and communication with a slightly worse performance (e.g., lower quality of service).

A design, which serves communication with a better performance (e.g., more data rate) and sensing with a slightly worse performance (but still sufficient to serve the sensing application within the allowed accuracy and false alarm rate). An example here may be If the communication is a critical service, like for example communication for remote operation robots in hospitals, which should have all resources it needs without tradeoffs. Other applications, comprising sensing applications may operate also with slightly reduced quality of service if resource limitation becomes an issue.

Figure 10:
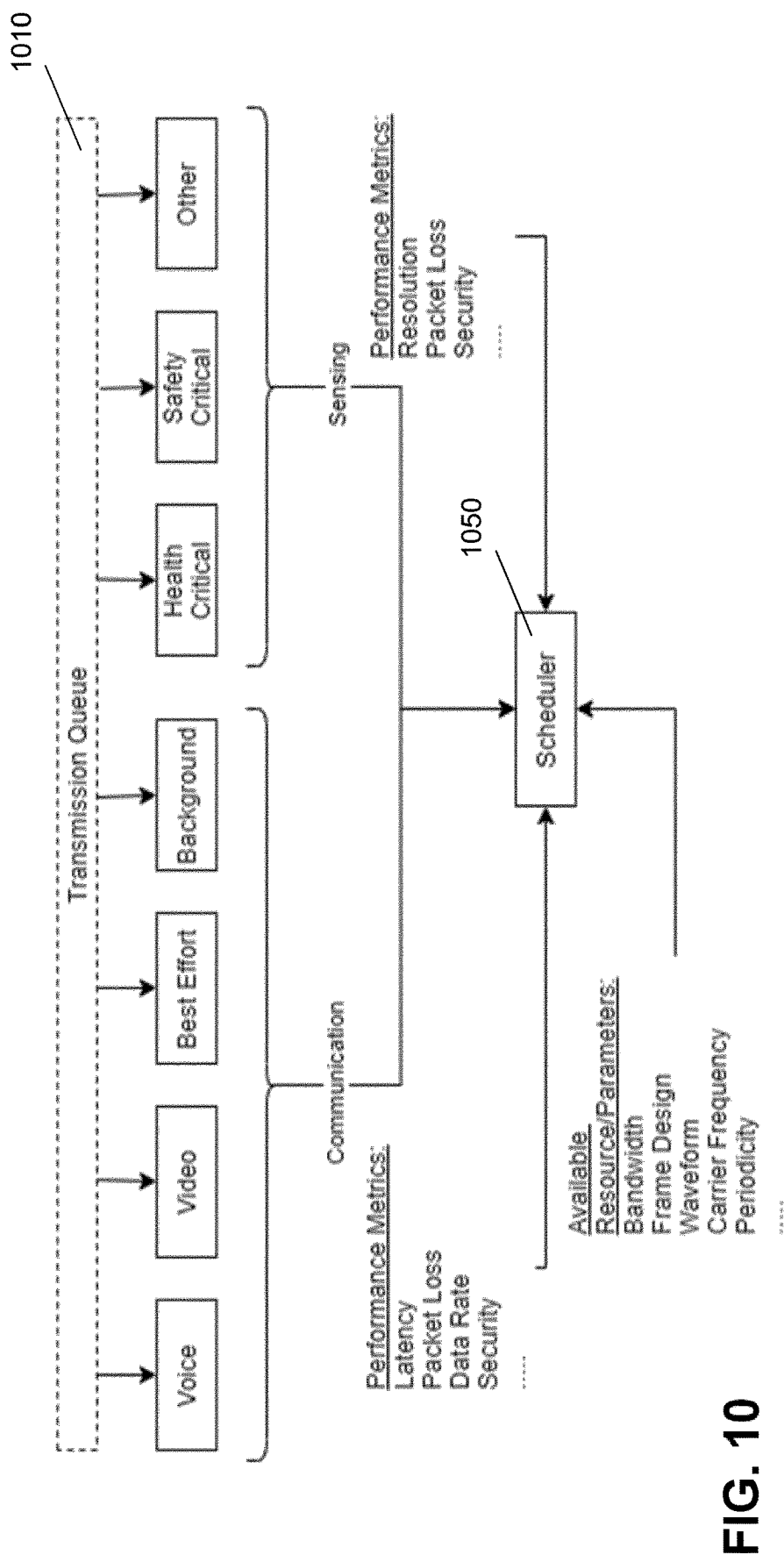
FIG. 10 is a block diagram illustrating exemplary adaptive frame selection criteria.

FIG. 10 illustrates an exemplary adaptive frame selection in a scheduling device. Illustrated is a scenario where there are different priorities of data and sensing transmissions. The transmission queue 1010 indicates the amount of transmissions waiting for each priority class. The communication classes may correspond to those known from some standards and comprise in this example: voice services, video services, background services and/or best effort services. These classes differ in requirements on performance such as latency, data rate, packet loss and security or the like. The sensing applications have now also various classes according to an embodiments. These classes comprise health-critical, safety-critical and/or other serviced (applications). These classes differ in requirements on performance such as resolution, packet loss and security or the like. The transmission mechanism/frame design of the sensing transmissions is selected by the scheduler 1050 based on the queue (amount of data to be scheduled and their priorities), performance requirements (such as those discussed above for the communication and sensing applications), priority and available resources. For example, when selecting a frame design/transmission mechanism, a voice or video communication cannot be postponed, but a best effort or background communication may be postponed. Similarly, health critical and safety critical sensing transmissions cannot be delayed or postponed, but other sensing applications can. Here, a joint communication and sensing scheme may be selected so that both, the time critical communication services and time critical sensing services (applications) can be scheduled.

The priority can be assigned considering the sensing and communication applications and the fallout that would happen if these applications were to fail. In this case, applications involving national security or human health may take priority over others. Between the same-priority applications, the use-case or environment conditions may be considered. For example, in a possible implementation, a wireless monitoring (surveillance) system for home security would have a lower priority than a wireless monitoring system for an area with more valuable objects, like banks. Therefore, the latter application use-case (deployment) would advantageously have a higher accuracy and lower false alarm rate (e.g. higher QoS requirements to meet).

Accordingly, a single frame structure and transmission mechanism design may not be efficient, even for the same applications. For lower priority applications and application use-cases (deployments), it may be permissible to use suboptimal frame and mechanism designs, whereas high priority applications should preferably use the optimal frame and mechanism design. Here, the term optimal refers to best possible out of a set of available (predefined) frame formats and/or transmission mechanisms. The degree of optimality or the optimization may be determined based on a cost function. Such cost function may comprise spectral efficiency constraint on fulfilling the quality of service or other requirements.

Priority may be assigned using a controller (e.g., in the scheduling device, or externally and possibly in communication with the scheduling device) or the human user as briefly discussed above. In some exemplary implementations, the controller employs artificial intelligence (AI) techniques or decides based on statistical features, which priority is to be assigned to an application.

Priority of sensing and communication functionalities, and priority in applications of these functionalities can be determined from the following parameters/criteria:

Device identity (ID): Devices with extremely critical tasks—regarding national security or directly impacting human life (e.g.: remote surgeries)—can have an ID which prioritizes all of their communication or sensing applications.

Application: The main application of the devices can be a priority criteria. For example, security devices should have priority over leisure communication devices. In one scenario, a wireless sensor security device monitoring an environment should have priority over wireless streaming devices/applications, but not over voice communication applications, as these could be calls to the authorities in the event of an unsafe situation.

QoS metrics: Some applications have strict QoS metrics. These applications should have priority over others. For example, after the previous two criteria, low-latency communication applications should have priority over non-critical sensing applications.

In an exemplary implementation, the frame and transmission mechanism adaptation is then performed as follows (by one or more following possibilities):

The application devices—wireless sensors, mobile phones, laptops and other wireless capable devices—may have assigned penalty and reward values for their applications based on their (applications') priorities.

The device (UE, STA, sensor device or in general a wireless device) may initiate their transmissions using a global frame (e.g. with the above-mentioned first frame format) and mechanism design determined by the controlling device (e.g. the scheduling device) or what is defined in the standards.

The wireless device (UE, STA, sensor device or the like) will transmit, in some embodiments, a feedback to the controlling device, and based on the feedback, the controlling device will change the parameters of the frame and/or transmission mechanism design adaptively.

In other words, according to an embodiment (combinable with any of the above-mentioned embodiments and examples) the method further comprises the step of receiving feedback from the wireless device. The feedback can be related to a quality of service requirements, priority, required resources, and/or channel quality.

In order to increase efficiency and adaption capability (adaptivity) of the system, in the method whether the resources for transmitting the sensing signal are allocated for the third frame format or for the second frame format is determined based on the received feedback. In addition or alternatively, the third frame format is determined based on the received feedback. For example, the third format is selected out of a predefined plurality of possible formats suitable for the sensing signal (sensing application).

The method may further comprise the step of determining one or more transmission parameters for the transmission of the signal based on the received feedback. For example, the transmission parameters comprise at least one of: transmission rate or repetition rate, carrier frequency, channel allocation, sensing sequence or waveform, characteristics of the environment, bandwidth, packet length or signal duration, beamforming parameters, numerology, cyclic prefix duration, or filtering or windowing parameters, or the like.

In a specific and exemplary embodiment, the one or more transmission parameters comprise the characteristics of the environment. Environment characteristics may have impact on the channel quality and coverage, especially in the bandwidths with low wavelengths such as millimeter waves or the like. For example, the characteristics of the environment are obtained at the wireless device by at least one of:

capturing an image of the environment and analyzing it with a module trained based on machine learning, or sensing the environment by a humidity, temperature and/or pressure sensor.

In other words, the environment conditions may be obtained by a sensing application such as an environment sensing application. For example, the characteristics of the environment may be obtained from an initial/coarse sensing transmissions. In addition, or alternatively, camera (may comprise usual cameras for human vision spectrum and/or infrared or the like) as mentioned above, alongside with some image processing may be employed. In general, any kind of sensing device to sense anything related to the environment (humidity, temperature, pressure, objects of the environment which can affect the channel characteristics, etc.) or any sensor which can be used to infer information about the environment can be used in addition or alternatively to the camera.

The transmission parameters may be changed adaptively based on the feedback, as mentioned above. In the following, some examples of such parameters are provided.

Packet Transmission Rate or Pulse Repetition Frequency

The packet transmission rate or repetition frequency may increase or decrease during the operation of a sensing or communication application. Especially sensing applications may have some periodic traffic corresponding to a periodic sensing signal and/or to a periodic signal for reporting the sensing data. This relates to the number of measurements made per time interval. Some applications cause/detect only small changes to the measurement results over the given time period. In these cases, the transmission rate or repetition frequency of the sensing signal (the signal used to sense or the signal used to report the sensing result) can be reduced, as the extra measurements will be redundant and could cause spectrum wastage. Conversely, some applications can cause highly dynamic changes of measured values. In these applications, there may be missed measurements, which would affect the ability of detection/recognition/identification. In these scenarios, the transmission rate or repetition frequency should increase to satisfy the accuracy requirements, at the cost of the spectral efficiency. Herein, when referring to packet transmission rate, what is meant is the frequency of packets conveying measurement reporting or measurement signal (such as sounding signal or signal with which the sensing is performed such as radar signal). Pulse repetition frequency may be for instance in radar applications the frequency of the radar pulse signal.

An example for a variable packet transmission rate or repetition frequency for different applications can be for pattern-based sensing in gesture identification and sleep position monitoring. In gesture identification, signals may be sent at a rate of 100 packets per seconds (pkts/s). On the other hand, 5-20 pkts/s may be used for sleep monitoring (position and breath rate). Some research shows that the change in packet transmission rate from 20 pkts/s to 5 pkts/s may cause only a negligible decrease in accuracy for sleep monitoring, as sleep processes vary over a longer time scale.

Further examples are possible as is known to those skilled in the art. For example, in environment (weather) sensing, even smaller packet rates may be used. For autonomous robot/vehicle navigation, radar sensing may require higher signal/packet transmission rates to increase safety. Thus, depending in the application, different packet transmission rates may be appropriate and adaptively changed (by the scheduling device) in some embodiments.

Carrier Frequency

Applications for detecting changes in location are better performed with millimeter-waves (mm-Wave)s due to their wavelength. Therefore, sensing can advantageously be performed in higher frequencies. However, for large objects or high amounts of motion, sensing in these frequencies results in many peaks (or detection). Therefore, sensing for these applications may be desirable in lower frequency bands, such as 2.4 GHz or 5 GHz. In other words, depending on the application and/or its deployment, the carrier frequency may be selected (by the scheduling device) for the sensing (signal).

Channel & Subcarrier

After frequency band and channel selection, it has been shown that some subcarriers may be more sensitive and predictable to some motions/objects/actions (due to possibly different propagation characteristics of signals with different frequencies). This may be especially critical in low-frequency pattern-based sensing applications with CSI or RSSI measurement, where some subcarriers may give no response to the action/motion/object to be detected and others give the same, if not similar, response each time. In these cases, placing the sensing sequence in some subcarriers may result in misses. Therefore, the sensing sequence subcarriers can be varied in some exemplary implementations, until suitable (e.g., optimum) subcarriers are found. Similarly, the channel may be varied to find the optimum subcarriers in communication or sensing applications. In general, subcarriers to be used in transmission of a sensing signal and/or communication signal may be adapted (by the scheduling device) according to channel quality feedback for those subcarriers.

Sensing Sequence & Waveform

Some sensing sequences have better auto-correlation properties than others. In the case of radar-based sensing applications, these properties are used to synchronize and detect time lag and frequency offset, which are then used to calculate range and velocity. In fingerprinting or pattern-based sensing, auto-correlation is also used to find impairments, such as frequency offset, phase offset, IQ imbalance, etc. which can be used for device identification. Similarly, different radar waveforms have different advantages and disadvantages. For example, pulsed radar waveforms have more spectrum and power efficiency, but cannot directly measure velocity. The same goes for different waveforms in communication technologies. For example, Orthogonal Frequency Division Multiplexing (OFDM) may have a higher PAPR, which can make it difficult to use for radar applications. OTFS may have better auto-correlation properties, but adds complexity to the receiver. Therefore, in some exemplary implementations, sensing sequence and/or signal waveform is changed based on the requirements and capabilities of the receiver, changing environment conditions, and changing target conditions. Additionally, if JSC waveforms are being used, the sensing and communication performances' can be considered jointly as well, as mentioned above. In general, the scheduling device may adapt (control, configure) the sensing sequence such as pseudo-random sequence or the pulse form (in general waveform) based on the objects to be sensed, e.g. based on the deployment of the sensing application. It may be advantageous, in case of JSC waveforms to select a waveform which is the same (common) for both communication and sensing and has a possibly best performance among a set of predefined waveforms.

Bandwidth

Bandwidth increases the velocity and range resolution of radar-based sensing. It can be related to the pattern-based sensing through the increase of subcarriers which can be used (measured), which will also increase the measured information. High resolution may be desirable for accurate wireless imaging, like wireless face recognition, cellular imaging, and/or other medical imaging technologies. Not all devices may support high bandwidth applications and increasing the bandwidth will decrease spectral efficiency. Accordingly, the scheduling device, in some exemplary implementations, adapts the bandwidth for the communication and/or sensing applications based on their requirements and based on other parameters such as load, channel quality, desired QoS, priority, and so on.

Packet Length/Signal Duration

This parameter determines the number of contiguous measurements in time. Long packet length/signal duration reduces spectral and power efficiency and possibly fairness. However, if the packet length/duration of the sensing signal is too short, the measurements may not be sufficient to detect the desired action/motion/object. Thus, the scheduler in some exemplary implementations configures the packet length for the sensing signal or the duration of the sensing signal depending on the sensing application and/or deployment.

Beamforming Parameters

In some scenarios, for example, highly cluttered scenarios, omnidirectional transmission of sensing signal may result in too many reflections and multipath, which cannot be processed correctly. In these scenarios, some devices use beamforming, where a signal is transmitted in a narrow beam, to reduce the number of multipath and reflections. In these cases, the beam parameters may need to be adaptively changed. If the beam width is too narrow, the signal may miss the object or may hit it but the resulting measurements would not reflect the true nature of the object. Conversely, if the beam width is too large, it may cause interference to other applications or increase multipath. Similarly, the angle of departure should be able to track the object and the sweep rate should be such that there is sufficient time to receive and process the measurements.

Numerology

In 5G cellular standards, there are different subcarrier spacings for different communication services and channel conditions configurable. Since the channel conditions typically reflect the physical environment to some extent, in some sensing applications it may be interesting to detect and track these channel conditions. Therefore, the subcarrier spacing which allows the subcarriers to experience the most channel changes may be preferable for sensing applications. However, these channel changes may be unfavorable for communication applications. Therefore, the chosen numerology may take into account. In particular, numerology for an application may be selected (e.g., configured by the scheduling device), depending on whether the wireless device to transmit the wireless signal(s) is JSC and/or whether the wireless device has active applications which perform both communication and sensing, so that switching of numerology may be avoided between the sensing and communication.

Besides the aforementioned transmission parameters, filter localization in time and frequency, CP duration, filtering/windowing, and filter length or other parameters can be select adaptively for sensing applications.

The transmission parameters such as those mentioned above may be used for null data packet (NDP) sounding and may thus correspond to sensing operational parameters. Since a measurement of a channel is typically made by the NDP, negotiating the transmission parameters of the NDP may be important in order to meet the performance requirements of the sensing applications.

In an environment, multiple sensing sessions belonging to unique sensing applications can take place simultaneously. There may be various configurations resulting from presence of several devices with overlapping signal coverage. Some exemplary configuration options are:
 a) Stand-alone devices, such as autonomous vehicles, that sense environment primarily by their own sensors,
 b) AP—non-AP STA, non-AP STA—non-AP STA (point-to-point, P2P) sensing and/or joint sensing and communication, and/or
 c) AP—multiple non-AP STA, non-AP STA—multiple non-AP STA (point-to-multipoint, P2M) sensing and/or joint sensing and communication.

As already mentioned above, some exemplary types of sensing (based on measurements) may comprise:
 Radar-based sensing as mentioned above (it may be based on delay measurement or delay as well as Doppler shift measurement),
 CSI-based sensing,
 RSSI-based sensing, and/or
 SNR-based sensing (e.g. sensing beam SNR).

For a trigger-based sensing, sensing operational parameters may be negotiated during a sensing session setup. This may provide the advantage that the parameters are only transmitted once during a session. On the other hand, they cannot be adapted to changing requirements during a session. In order to do so, the session would need to be terminated and re-negotiated.

Another option is a negotiation of the sensing operational parameters during measurement setup. With such negotiation, the sensing operational parameters can be transmitted as frequently as necessary. On the other hand, a responding STA (RSTA) may not be able to support these parameters.

In an advantageous implementation of a sensing device such as STA or AP, the negotiating of the operational parameters is performed compulsory in the sensing session setup and optionally in the measurement setup. If the operational parameters are not (re)defined in the measurement setup, they are assumed to remain unchanged in comparison with the operational parameters negotiated at the sensing session setup. Accordingly, an exemplary STA or AP is configured to negotiate the sensing operational parameters at a session start and it may be further configured to negotiate operational parameters within the measurement setup. For instance, there may be a condition, e.g., based on channel state, according to which the sensing device determines whether or not to (re)negotiate the initially negotiated sensing operational parameters.

Among the above discussed operations parameters, the parameters that are likely to affect the quality and rate (possibly also computational complexity) of the sensing to a higher degree are:
 Requested sensing rate (specifying how frequently the sensing is performed, which may be given, e.g. by the minimum number of frames per second to be transmitted by the transmitting device).
 Bandwidth or channel width (e.g. specifying the uninterrupted (continuous in frequency domain) bandwidth of transmission)
 Beamwidth (e.g. the relative beamwidth (given, for instance by levels such as three levels coarse, mid, fine for above-60 G Hz band).
 Transmit output power (e.g. specifying the accepted minimum and maximum transmit output power of the transmission).

In the following, these sensing operational parameters and their impact are discussed in more detail.

The requested sensing rate may be represented by the frequency of the NDPs and of the corresponding measurements determines the time-domain resolution of the measurements. Different sensing applications can have different requirements for the time resolution. For example, a gesture recognition needs more frequent measurements (e.g., 100 frames/second) than the sleep monitoring (performing still well with 5 frames/second) as mentioned above. If there are too few NDPs and the corresponding measurements, the measurements may become old (outdated) which may be caused by the channel conditions changing within the NDP repetition period. On the other hand, if there are too many NDPs and the corresponding measurements, the network traffic may increase unnecessarily. Measurements that exceed a certain number of measurements per time may not further contribute to a significant increase in the sensing performance. It is noted that transmitting NDPs with a strict (fixed) rate may not be suitable due to equipment shortcomings, no free channels at that time, and/or possible collisions or further factors. For similar reasons, the time interval between consecutive transmissions may not be always accurately implementable. Accordingly, a meaningful operational parameter specifying the requested sensing rate may be the minimum number of frames per second to be transmitted by the transmitting device. Alternatively or in addition, an average number of frames per second may be specified.

Bandwidth affects range resolution in radar sensing. The wider the bandwidth, the finer the resolution. For autonomous vehicles and V2V scenarios, radar using 802.11p PPDU has been studied and found that the 10 MHz bandwidth allowed is not sufficient for the typically desired range resolution (and thus target separability) while around 100 MHz may be sufficient. Therefore, if bandwidth is negotiable, IEEE 802.11bf amendment can be used in such applications. Bandwidth also increases the number of measurements per frame for CSI-based sensing, therefore capturing more information, even if a compressed CSI metric is reported.

Determining or standardizing a quantitative value for the beamwidth may be hardware dependent to a high extent. Therefore, it is advantageous to determine relative or qualitative terms, which reflect the capabilities of the transmitting device. For example, as mentioned above, the beamwidth of the transmission in a bandwidth above-60 GHz is the beamwidth of the NDP relative to the device capabilities. Such relative values may be, for instance: coarse, mid, and fine beam. However, the present disclosure is not limited thereto and, in general, there may be only two levels (e.g., broad and narrow) or more than three values. It is also noted that in general, the embodiments of the present disclosure may also be implemented by referring to directly to a beamwidth and not to the above mentioned relative values.

In radar-based sensing, the transmission power is directly related to the range or distance that can be measured. There can be some applications, which are only interested in objects within a certain radius of the transmitter. Having transmit output power as an operational parameter would prevent unnecessary reflections and computation to remove these reflections, conserve power, reduce interference, improve spectral reuse, etc. Similarly as in case of the bandwidth, the NDP may contain the Tx power in its signalization. However, the transmission power may still need to be negotiated if the sensing transmitter is not the same as the sensing receiver. Determining a fixed value for the transmit output power may not always be possible due to other restrictions defined by the standard or interference mitigation techniques. In order to provide an operational parameter, the transmission power may be negotiated (and thus defined) as a requested minimum and maximum transmit output powers of the signal to achieve the sensing performance.

In general, according to an embodiment of the present disclosure (which may be combined with the above mentioned embodiments relating to co-existing wireless sensing and joint sensing and communication applications; negotiating operational parameters is performed in the sensing session setup. In addition, the negotiating of the operational parameters may be performed in the measurement setup. For example, the NDP transmitting and/or receiving device may initiate the negotiation in the measurement setup based on some event, such as measurement of highly changing channel conditions or the like. Whether or not such event occurs may be determined based on a condition, such as exceeding a certain threshold on channel state change or received power or the like.

If the operational parameters are not defined in the measurement setup, they are assumed unchanged.

One or more (or all) of the following parameters are advantageously shall be negotiated in the sensing session setup phase and can be optionally negotiated in the measurement setup phase:

Requested sensing rate

Bandwidth or channel width

Beamwidth

Transmit output power

It is noted that the present disclosure does not exclude adding further parameters. For example, the number of transmitting and receiving antennas may provide further information about the available hardware in addition to the beamwidth.

According to a particular exemplary implementation, the requested sensing rate is the minimum number of sensing frames per second to be transmitted by the transmitting device. The bandwidth is the contiguous bandwidth of a sensing transmission. Beamwidth of the transmission in above-60 GHz bandwidth is the beamwidth of the NDP relative to the device capabilities. There may be three possible width indicating values that can be distinguished (negotiated). Transmit output power may be the requested minimum and maximum transmit output powers of the signal to achieve the sensing performance.

In the following tables, known exemplary use cases are shown which illustrate how different values may affect the performance of sensing or communication.

In particular, Table 1 relates to requested sensing rate. The percentage of sensing transmissions to the other transmissions is given for some applications there. For example, for presence detection, the sensing transmissions result in up to 2% network load. This is related to the periodicity and thus to the requested sensing rate.

TABLE 1

| Network Load (%) | Applications |
|---|---|
| ≤2 | Presence detection, human counting, localization, motion detection, proximity detection |
| ≤5 | Detection of humans in car, gesture recognition (finger + hand), human counting, localization, speed detection |

TABLE 1-continued

| Network Load (%) | Applications |
|---|---|
| ≤10 | Intruder detection, gesture detection (body), aliveness detection, face/body recognition, fall detection, sneeze detection, driver sleepiness detection, heart rate, breathing rate measurements, person localization and tracking, |

Table 2 below relates to contiguous bandwidth or channel width. In particular, bandwidth B has the following impact on range resolution (to which the separability is related) ΔR, ΔR=c/(2B), and on maximum velocity, v_max=λB/2, with λ being the signal wavelength.

TABLE 2

| Range Separability (m) | Applications |
|---|---|
| ≤0.1 | 3D vision |
| ≤0.5 | Presence detection, human counting, human tracking, breathing rate, heart rate detection, sneeze sensing, fall detection, detection of human in car, |
| ≤1 | Person tracking, motion/gesture detection, |
| ≤2 | Proximity detection |

Moreover, Table 3 illustrates an impact of the beamwidth on angular separability (resolution) and thus on various applications. For 60 GHz bandwidth (and higher) the angular resolution Δθ is given by:

$$\Delta\theta = 2R \sin \frac{\theta}{2},$$

wherein θ is the beamwidth and R the slant range.

TABLE 3

| Angular Separability (°) | Applications |
|---|---|
| ≤3 | 3D vision |
| 3-4 | Presence detection, human counting, localization, detection of humans in car |
| 5-6 | Sneeze detection |

Table 4 illustrates a maximum range that is necessary for certain applications. The maximum range is proportional to the transmission power.

| Maximum Range/Distance (m) | Applications |
|---|---|
| ≤1 | Gesture recognition (finger movement), aliveness detection, face/body recognition, proximity detection, |
| ≤5 | Gesture recognition (hand movement), human detection in car, driver sleepiness detection, breathing rate, heart rate measurement |
| ≤10 | Presence detection (home security), human counting (meeting room), human localization, motion detection, human tracking, gesture recognition (full body movement), fall detection, sneeze detection, 3D vision |
| >10 | Presence detection (number of persons in room, store sensing), human counting (store sensing) |

As can be seen from the above exemplary sensing application requirements, they may be an indication used in determining the allocation of the resources, possibly comprising the selection of the frame format. In other words, said allocating resources for the transmission of the signal may be performed according to requirements of a sensing application using said sensing signal, wherein the requirements relate to at least one of bandwidth, beamwidth, sensing rate, and transmission power. The requirement may be given in terms of the desired application. In such instances, the corresponding related requirements may be determined based on the application, e.g., based on some predetermined association (e.g., as shown in tables 1 to 4).

The requirements may be obtained in negotiation between the scheduling device and the wireless device. For example, the requirements may be obtained (received) from said wireless device or determined based on information provided by said wireless device at a beginning of sensing session, and/or during a measurement session which is a part of said sensing session.

According to some embodiments, the wireless device requests resources for some application which may request to perform sensing or communication. The scheduling device takes into account whether the signal to be transmitted is a sensing signal (generated for sensing or as a report of sensing) or a communication signal, and configures the frame format (allocates the resources correspondingly to the configured frame format) and/or the transmission parameters accordingly.

The adaption of the frame format and/or transmission parameters may further occur periodically or based on some penalty threshold to adaptively improve the JSC performance for changing environment conditions and addition/removal of users (UE)s. The adaption may be based on the results of some sensing reported to the scheduling device, such as environment sensing or channel sensing.

However, in some embodiments, a similar process can be done without feedback, e.g., after priority selection is done. For example, the sensing receiver or sensing transmitter can be aware of the environment by AI-based techniques and its frame design can be selected according to artificial intelligence (AI) specifically trained for this task. For example, a picture of the environment can be taken by a camera. Then, this image can be used as an input and the output will be the optimum frame design. After enough dataset is collected, the AI-machine can be trained according to the input and output data. The amount of dataset can be decided according to the loss function in the specific scenario. In the testing stage, again, the camera can take a picture of the environment and decide the best frame design based on the trained machine learning algorithm. This may be implemented by the scheduling device. Alternatively, an external device may sense environment, evaluate the data and provide them to the scheduling device which may comprise a module trained to select the appropriate frame format based on the sensed environment. It is conceivable that the frame decision is performed by a separate device in communication with the scheduling device. Alternatively or in addition, different sensing applications may be considered (differing in priority and performance requirements). Environment, security, device capabilities can be used as an input while the output is the possible frame design/transmission mechanism. According to this setting, the machine can be trained based on available/known data and in the testing stage, based on the requirements stated above, a frame design/transmission mechanism can be decided. There are some frame design options for improved security, such as frequency hopping or spreading the signal to prevent the detection by other devices. These may be employed if security requirements are higher. Such mechanism do not need to be applied if security requirements are lower.

Frame and transmission mechanism adaptation may be advantageous due to changes in the environment and spectrum conditions. For example, if more objects enter the sensing area (such as the one shown in FIG. 3), the beam width may need to be decreased. This may be done in order to reduce interference. Also, variations due to the time of the day may be considered. For example, in the daytime, wireless resources may be scarcer due to an abundance of active devices and less optimal frame design and transmission mechanisms may need to be selected. However, at nighttime, there are more available resources. The efficient or even optimal frame design and transmission mechanisms can be thus selected. Similarly, the nighttime usually presents a more stationary environment, therefore wider beam widths, more bandwidth and different channels/subcarriers can be used without the added effect of the mobility added by non-target objects. The scheduling device may be configured to determine the day and/or day time and adapt one or more of the transmission parameters accordingly.

For example, there can be two different scenarios, which are illustrated in the different rooms of FIG. 3. The wireless capable devices (AP, STA, WS) in the figure all operate in the same or at least partially overlapping frequency bands. In the figure, STAs are wireless communication devices (TVs, laptops, computers, mobile phones, etc.) which have some level of sensing capabilities, the most basic being measuring some features of the received signal, up to processing this information to gain environmental awareness. Wireless sensor (WS) devices are sensing devices or device systems, whose sole function is to perform wireless sensing. APs are wireless access points (they can also be network controllers, edge nodes, enhanced nodes, base stations, etc.).

In scenario 1 there are stand-Alone Sensing Devices. This scenario is depicted in the bathroom in FIG. 3 comprising wireless sensor WS. Sensing devices or systems can consist of a single device which is a receiver and/or a transceiver or multiple devices where one or more is a transmitter and one or more is a receiver. The sensing device or system does not have any means or method of communicating with other networks or devices. Here, if the system is isolated from other wireless signals, it can use whichever signal it prefers among its components or for sensing. However, depending on change in features of the action/object to be detected, the frame design and transmission mechanism may also be advantageous to change. If the system is not isolated, then the sensing device/system may coexist with other devices/networks. Because in some scenarios it cannot communicate with other devices, it has possibly no way of coordinating its transmissions. As such, it may adaptively change its frame design and transmission mechanism parameters to changing spectrum conditions. Additionally, one sensing device or system may serve multiple sensing applications. In this case, the optimum frame design and transmission mechanism may be selected—if there is one. If such a frame design and transmission mechanism does not exist, the framework should group the most similar applications and select two or more frame design and transmission mechanisms such that there is minimal number of selections. The selected frame design and transmission mechanisms should not conflict or interfere with each other.

Scenario 2 is a Wi-Fi Network with Sensing and Communicating Devices. This scenario is depicted, e.g., in the bedroom in FIG. 3. Here, there are one or many STAs, APs, and sensing devices. As before, the sole purpose of the sensing device is to detect an action/object/person/etc. However, in this scenario, the sensing devices are a part of the network and have some level of coordination with the controlling device (AP/base station/etc). In this scenario, the controlling device (scheduling device) will adaptively change the frame design and transmission mechanism parameters such that the most number and type of devices can utilize the signal for sensing and/or joint sensing and communication. This must be done adaptively to support any new device to the network and remove the redundancy due to devices leaving the network.

An example for serving multiple sensing applications can be as follows—recall the packet transmission rates for gesture identification and sleep monitoring sensing applications mentioned above. If the same frame design is suitable for both, then the receiver sensors can synchronize to the transmitter, which will transmit at the minimum required rate. For this example, it is 100 pkts/s for gesture identification. The other device will sample the packets as requires (5-20 pkts/s). Thus, with one frame design and transmission mechanism (and with one transmission), both of the applications can be supported and additional transmissions are not needed. In other words, the wireless signal to be transmitted may be a signal comprising combined sensing reports from one or more sensing applications. There may be a specific frame field format for such combined reporting.

In summary, different frame structures, numerologies, and waveforms can be used for different user requirements as well as for different sensing applications. Different transmission mechanisms can be used for different user requirements as well as for different sensing applications. Frame design accepted by the standards or present in the literature—like PPDUs used in Wi-Fi control signalization and chirp waveform used commonly in radar application—and their variations can be altered by changing the above mentioned parameters, like sensing sequence type and placement, in order to leverage some of their qualities and satisfy the sensing application requirements.

The changing may be done adaptively (adaptive frame design) to support several different applications in the same or different devices (sensor) and changing environment conditions. One sensor or STA can be used for different sensing applications. Adaptive frame design can be used to support these applications jointly and separately. Rather than using the Wi-Fi signal, cellular and any other communication signal can be used. With feedback information, dynamic adaptation methods and scheduling, which consider the sensing application requirements, the environmental conditions, network traffic, spectrum occupancy information, etc., can be investigated in order to yield better frame structures. Additional criteria are the sensing application requirements—accuracy, resolution, range, etc., the environment conditions—amount of clutter, nature of the object/action to be detected, etc., network traffic, spectrum occupancy, etc.

The frame design parameters are, but not limited to, bandwidth, waveform, sensing sequence, sensing sequence placement, duty cycle, signal duration, angle of departure (AoD), beamwidth, and/or beam sweep rate, etc. The transmission mechanism parameters are, but not limited to, signal repetition rate, and/or transmitting power, etc. Adaptation can be made in several domain domains such as time, frequency, space and/or code domain.

The above described embodiments of the disclosure and some exemplary embodiments may provide one or more of the following advantages. The present disclosure may provide more flexible, adaptive, and dynamic structure for wireless sensing, and/or joint (combined) communication and/or sensing. Different frame design and transmission mechanisms have different properties, advantages and disadvantages. Some embodiments and examples may leverage these advantages and disadvantages to satisfy the sensing application requirements with minimal degradation of network performance. For example, some embodiments may allow the support of multiple sensing applications with minimal resources by grouping sensing applications with similar requirements and serving them with a single transmission based on the selected optimal frame design and transmission mechanism. In this way, improved or optimal performance for sensing applications may be approached by selecting frame designs and transmission parameters based on their priorities, ensuring that high priority applications are able to operate with optimal resources. All of such advantages may serve to ease the integration of multiple sensing and joint sensing and communication devices into current and next-generation wireless networks.

It is noted that the frame format does not necessarily refer to changing the field structure of the frame. Different frame designs and/or different waveforms can be utilized to obtain better sensing and overall system performance. For example, in case of a purely sensing linear frequency modulated continuous wave (FMCW) radar signal, there is no field structure for a transmission frame. This is because linear FMCW signals are typically not modulated with data for which a field-based frame structure is usually used. Thus, such FMCW signal would not contain any information. However, there can be an appropriate frame design. For example, one field of a frame would be modulated with data and another field would not be modulated but rather comprising only a sensing waveform. In this way, coexistence of sensing signals and communication signals within one bandwidth may be achieved. Alternatively, a data-modulated radar waveform can be used, or any other joint radar-communication waveforms can be used, or a dictionary of radar waveforms that can be coded for communication can be used. The scheduler may decide, as described above, which of these options to select based on the application and further conditions.

The scheduler may decide on one or more of different parameterization of frames, numerologies, or waveforms to support several sensing applications. These parameters can be adjusted adaptively based on environmental conditions and sensing application requirements.

A waveform can be selected based on the sensing application and/or environmental conditions. For example, OFDM, FBMC, or FMWC can be used regarding sensing applications and environmental conditions. Besides that, parameters of these waveforms can be changed adaptively. Some of these parameters are; CP rate, windowing/filtering, subcarrier spacing, number of subcarriers, filter length, and/or filter localization in time/frequency. All of these parameters have some properties. For example, when CP length is increased, it will provide more robustness, increase channel estimation, and synchronization quality. However, it will decrease spectral efficiency. On the other hand, windowing is used to suppress OOB leakage. Also, it reduces interference caused by adjacent channels. However, it decreases the spectral efficiency and increases the latency. All of these parameters should be selected based on the environmental characteristic and sensing application in an optimum manner.

It may be inefficient to support all of the sensing applications with one waveform since every waveform has its own advantages and disadvantages (trade-off). Therefore, the coexistence of multiple numerologies has to be supported. Besides that, parameters of the numerologies can be flexible. This is especially the case where sensing applications require different numerologies at the same time. Flexibility is desirable to support a wide variety of sensing applications. This flexibility should be provided for waveform, numerology, and frame. Also, different transmit powers can be considered as flexibility at the system level.

In addition to the flexible waveform and numerology design, hybrid frames comprising multiple numerologies based on multiple waveform technologies can be used to support a wide variety of sensing applications.

For instance, Wi-Fi channels are usually 10 or 20 Mhz wide. However, in the newer standards, to support higher data rate applications adjacent channels are joined to form channels, which are 40 Mhz, 80 Mhz, up to 320 MHz wide. For some sensing applications the range resolution or measurement resolution provided by 20 MHz is sufficient, but for others, the channels need to be combined (i.e., increasing the bandwidth) to get better range/measurement resolution. For example, in CSI based gesture recognition, 20 MHz channels may be used, On the other hand, Wi-Fi (802.11p) may be used for automotive radar, where 20 MHz is not sufficient and bandwidths of at least 100 MHz may be required.

The transmission mechanism or transmission parameters, as mentioned above, comprise but are not limited to the periodicity or rate of the sensing signal and channel access methods. Another transmission parameter may be one or more numerologies, which define subcarrier spacings (and, possibly also time interval/symbol duration). While this may be important in CSI based sensing applications, where the channel response of each subcarrier may vary, and therefore, specific subcarrier selection may be important, it does not cover the entire scope of the present disclosure. For example, other waveforms, such as FMCW, do not (have to) support multiple numerologies.

In communication, the repetition of the frame/transmission is different from sensing. The number of packets to be re-transmitted is typically small and usually it is a burst transmission until the acknowledgement is received. It is related to throughput and reliability metrics. Also, there is no specific rate, duty cycle, or strict constraints in the no-transmission intervals between the repeating signals. In sensing, repetition (periodicity) is more long-term (it can last hours/days). It has strict requirements for duty-cycle or time between transmissions, as measurements are required to be at known/specific (predetermined) times.

Beam sweeping is related to wireless sensing and may also be considered, as mentioned above. Flexible and adaptive frame design selection for one sensing application or a general frame design selection to serve multiple sensing applications may be advantageous for coexisting multiple wireless technologies. In particular, different parameterization of frames, numerologies, or waveforms can be used to support several sensing applications. These parameters can be adjusted adaptively based on environmental conditions and sensing application requirements.

In one exemplary embodiment, waveform is selected based on the sensing application and/or environmental conditions. For example, OFDM, filter-bank multicarrier modulation (FBMC), or FMWC can be used regarding sensing applications and environmental conditions. For example, OFDM can be used in autonomous vehicle applications, as the range and velocity resolution it provides may be sufficient for detecting other vehicles. Mm-Wave FMCW can be used in medical monitoring examples such as biomedical imaging, because it has better auto-correlation properties than OFDM for the same parameters. Therefore, detection of minute peaks (which may be present in medical imaging) can be performed more accurately (e.g. less false alarms). Similarly, because the autocorrelation of OFDM is not perfect, unlike FMCW, in cluttered environments, all of the peaks (due to reflections from different objects) may not be easily distinguishable. However, in FMCW, they would be more pronounced.

Besides that, parameters of these waveforms can be changed adaptively. Some of these parameters are: CP rate, windowing/filtering, subcarrier spacing, number of subcarriers, filter length, and/or filter localization in time/frequency. All of these parameters have some properties. For example, when CP length is increased, it will provide more robustness, increase channel estimation, and synchronization quality. However, it will decrease spectral efficiency. On the other hand, windowing is used to suppress OOB leakage. Also, it reduces interference caused by adjacent channels. However, it decreases the spectral efficiency and increases the latency. All of these parameters should be selected based on the environmental characteristic and sensing application in an optimum manner. For example, in CSI/CFR based sensing, it may be desirable to have distinguishable CSI measurements for different actions (or things being sensed). In this case, it would be easier to extract distinguishable CSI data from measurements if we had more CSI data per measurement (which corresponds to more subcarriers). If the environment is not very complex, less measurements may be performed in a bandwidth, which would correspond to increasing the subcarrier spacing (and vice versa).

Advantageously, the coexistence of multiple numerologies may be supported. Parameters of the numerologies can be flexible. This is especially the case where sensing applications require different numerologies at the same time. Each sensing application can have requirements for which certain numerology may be more suitable than others. To support several sensing applications at the same time, coexistence of different numerologies may be desirable. In addition to the flexible waveform and numerology design, hybrid frames comprising multiple numerologies based on multiple waveform technologies can be used to support a wide variety of sensing applications. Flexibility may be desirable to support a wide variety of sensing applications. This flexibility should be provided for waveform, numerology, and frame. Also, different transmit powers can be considered as flexibility at the system level.

Figure 4:
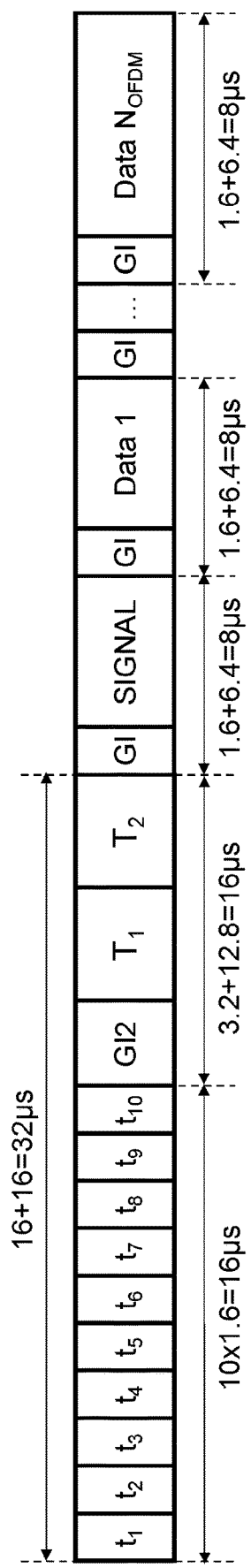
FIG. 4 is a schematic drawing illustrating an exemplary frame format for IEEE 802.11p.

One possible frame design and waveform may be given by standard IEEE 802.11p as shown in FIG. 4. The reuse of communication systems for radar sensing is of particular interest in the case of vehicle to vehicle (V2V) communication scenarios, especially considering the evolution of autonomous vehicles. The use of IEEE 802.11p standard for radar sensing has been explored and developed recently. The IEEE 802.11p standard is a V2V physical layer protocol. It is adapted from the IEEE 802.11a standard for transmitting data in a geographic specific Dedicated Short Range Communication (DSRC) band using Orthogonal Frequency Division Multiplexing (OFDM) The frame has a bandwidth of 30 MHz, divisible to 10 MHz sub-bands, in the 5.875-5.905 GHz frequency band. The preamble, which is used for radar sensing, consists of 4 OFDM symbols (a total of 32 microseconds long) and comprises short training symbols t1-t10 (may be used for time synchronization), two consecutive guard intervals GI2, and long training symbols T1 and T2 (may be used for frequency synchronization and/or channel estimation). Then, separated by guard intervals (GI), signaling and data are multiplexed in chunks of the same size (6.4 microsec.). Among the abovementioned fields, the training fields may be used for sensing. DATA field(s) may be used for communication signal or left unused. SIGNAL field(s) may be used for communication-related signaling such as packet length, code rate, modulation. It is conceivable that the data field or signaling field may also carry signaling regarding sensing signal configuration.

For example, in using Wi-Fi packets for sensing, if the receiver does not have a copy of the transmitted signal, only the training sequences can be used for sensing because these are known from the standards. The data part and signaling part are not used in this example. Therefore, particular fields are not selected for sensing. However, in some exemplary embodiments, portions similar to data or signaling fields may be used for sensing signal (e.g., per frame definition or signaling field may indicate which portions are to carry data and which portions are to carry sensing).

Regarding frame format adaption, for example, for gesture detection, the frame format of 802.11ad may be preferred by scheduler because it has much better range and velocity resolution, which is critical to detect small motions. However, the frame design of 802.11p is not used because its velocity and range resolution it too low. On the other hand, 802.11p frame structure is being used for radar in vehicles (though with an increased bandwidth).

The performance enabled with such frame structure may provide range resolution of 5.3 m and velocity resolution: 4.3 m/s. There may be some drawbacks of this structure. For example, it cannot achieve cm-level range and velocity resolution. The range resolution is limited by the bandwidth, and the velocity resolution is limited by the number of OFDM symbols in the packet. To provide meter level range resolution, more than 100 MHz BW may be appropriate. Nevertheless, for some applications, this frame structure may be still used.

Figure 5:
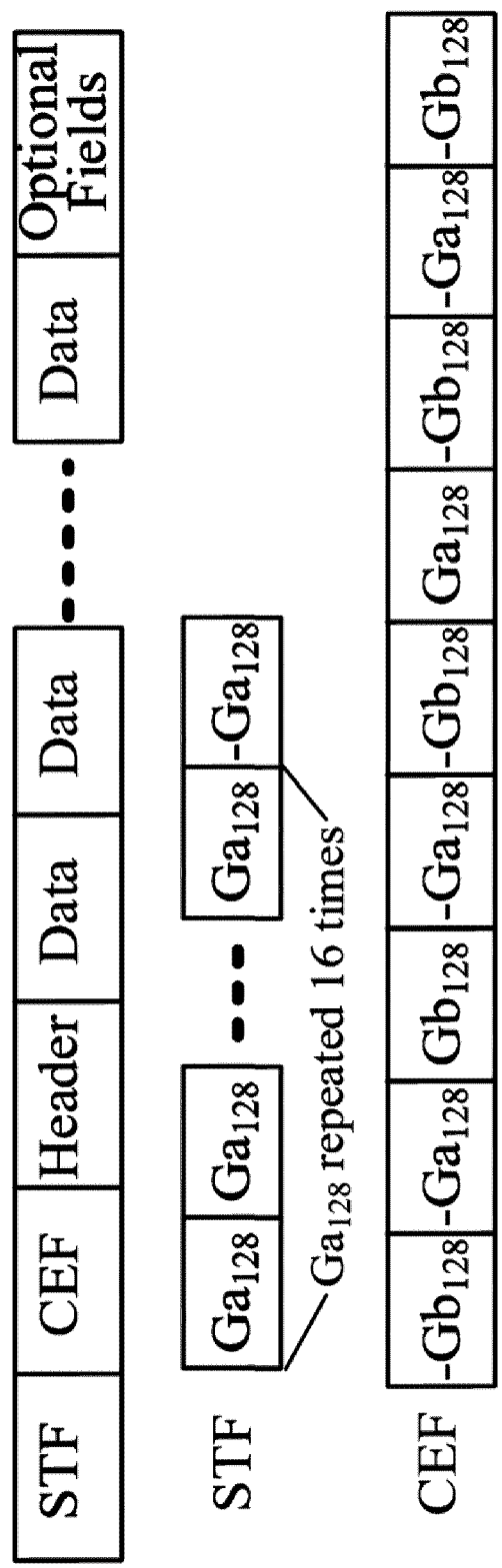
FIG. 5 is a schematic drawing illustrating an exemplary frame format for IEEE 802.11ad.

IEEE 802.11ad provides a different frame design, illustrated in FIG. 5. The operating frequency is in the mm-wave band, therefore beamforming is used. There are 4 channels, each with a bandwidth of ~2 GHz. The frame is a single carrier frame containing short training field (STF) as a part of preamble and a channel estimation field (CEF). The STF has Golay complementary sequences (GCS), which have perfect auto-correlation and are therefore suitable for radar sensing. The CEF also uses some Golay complementary sequences for channel estimation.

With this frame structure, a range resolution of 8.52 cm is achievable, as well as velocity resolution of 0.59 m/s. There are some drawbacks: Velocity estimation accuracy may not be sufficient due to short preamble length. This can be mitigated by non-uniformly placing the preamble to capture nuances of the channel at the cost of reduced data rate. There may be a narrow field-of-view because of the beam width. This can be mitigated by utilizing the sidelobes of the beam at the cost of reduced throughout. Mm-wave equipment is also expensive, since it is difficult to synchronization and sampling rate is difficult actualize at these frequencies.

Figure 6:
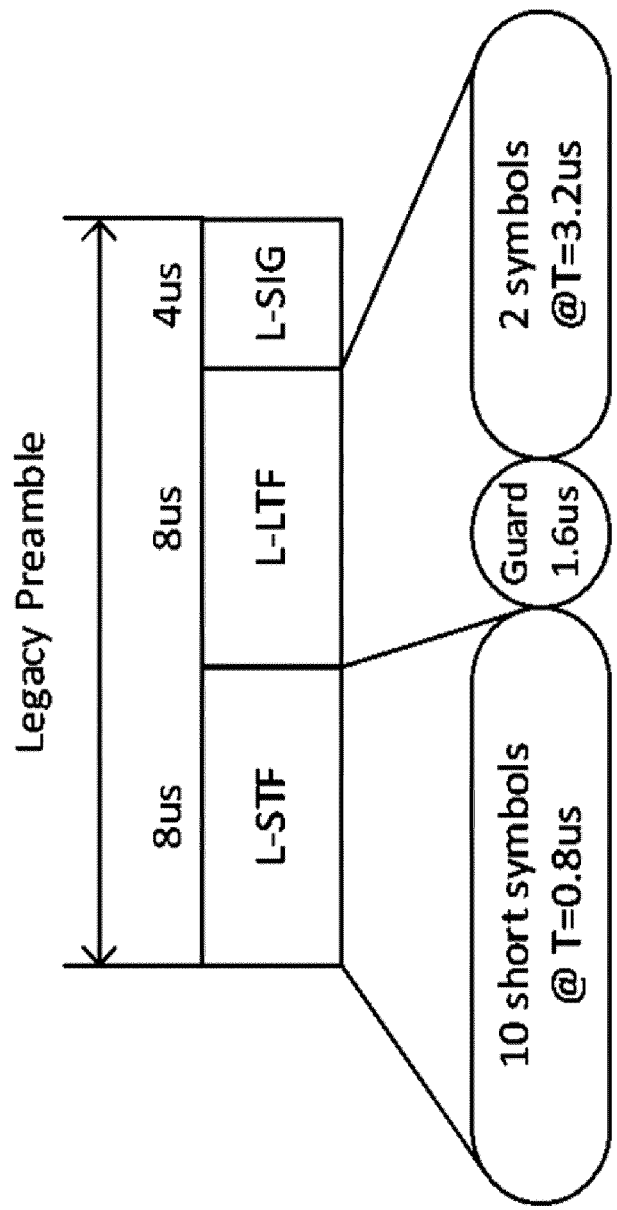
FIG. 6 is a schematic drawing illustrating an exemplary preamble format proposed for IEEE 802.11bf.
Figure 7:
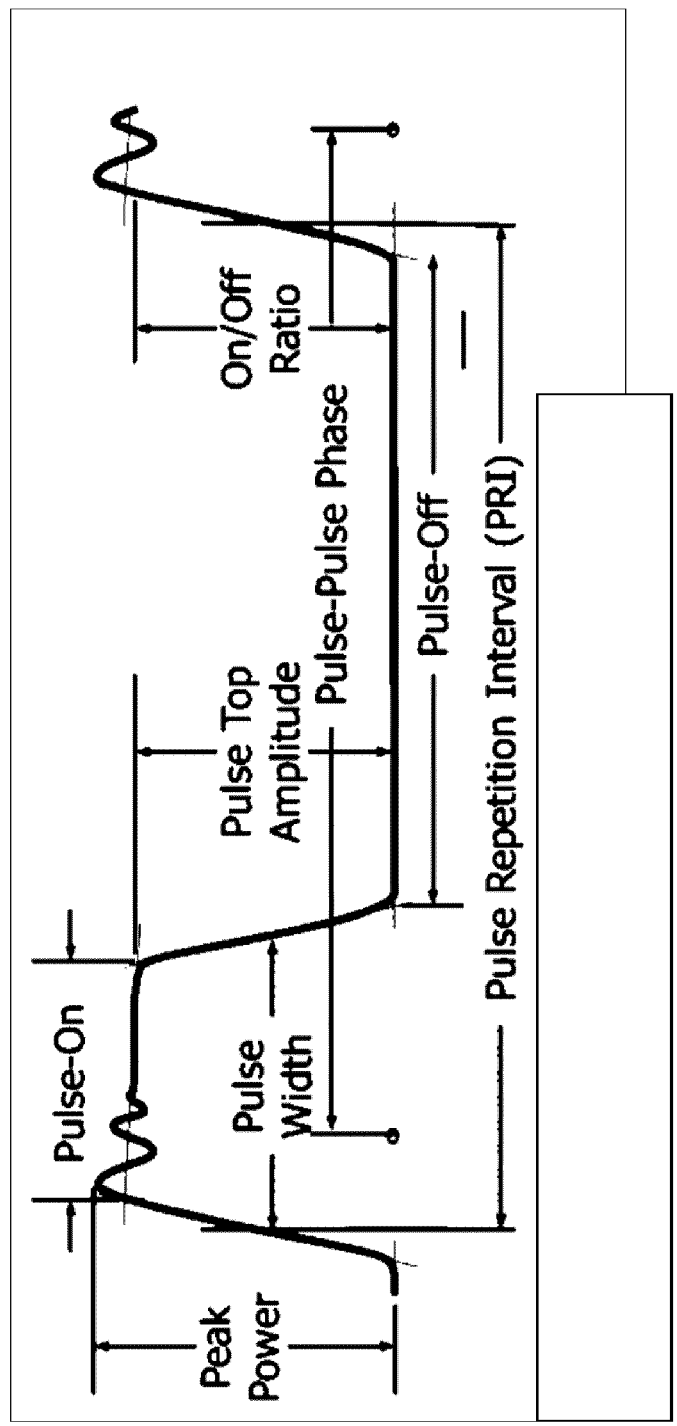
FIG. 7 is a schematic drawing illustrating an exemplary pulse shape format for a pulsed radar.

Another exemplary frame format is the possible IEEE 802.11bf frame format (not yet standardized, but standardization and proposals pending), a legacy preamble of which is shown in FIG. 6. It comprises legacy STF (L-STF), legacy long training period (L-LTF), and a legacy signaling field (L-SIG) for carrying physical layer signaling. The frame format has a bandwidth of 20 MHz. For more recently defined OFDM PHYs (HT/VHT/HE) with a wider bandwidth (due to combining channels), the legacy preamble may by duplicated on each 20 MHz, allowing a greater bandwidth overall, and more channel frequency measurements. Here, increasing of the bandwidth is possible, and therefore a better range resolution is possible. At the same time, increasing bandwidth increases the periodicity (the repetition of the preambles), therefore, better velocity resolution may be possible.

Another exemplary format is the radar application signal without embedding into any particular frame structure. There are various radar waveforms that can be used. The most popular are the pulse radar and frequency modulated continuous wave (FMCW) chirp radar. In pulse radar, the signal is "on" (or being transmitted) during some time of the total frame time, and "off" (not transmitted) the rest of the time. The duration the signal is "on" or "off" (duty cycle) gives a trade-off between range and range resolution. Longer "on" periods (wider pulse width) provides better range, but poor resolution and vice versa. A pulsed radar example is as shown in Fig. FMCW chirps are continuous (no off time) and are also able to detect relative velocity (pulsed radars cannot do this without some modifications).

For example, radar-based communication waveforms—linear frequency modulated continuous phase modulation may be employed as shown in Y. Zhang, Q. Li, L. Huang and J. Song, "Waveform design for joint radar-communication system with multi-user based on MIMO radar," 2017 *IEEE Radar Conference (RadarConf)*, Seattle, WA, 2017, pp. 0415-0418, doi: 10.1109/RADAR.2017.7944238. The parameters used are given in a table below.

| Parameter | Value |
|---|---|
| Number of subcarrier | 8 |
| Bandwidth of each subcarrier | 0.1 MHz |
| Bandwidth-delay product | 256 |
| Number of communication symbols of each subcarrier in one pulse | 256 |
| Modulation of the communication symbols | Continuous phase modulation (CPM) |
| CPM modulation order | 4 |
| CPM modulation index | ¼ |
| CPM shaping pulse | Raised Cosine |
| Rolloff factor | 0.2 |
| CPM Correlation length | 2 |

There are many types of waveforms that can be used for both sensing, radar and communication, as has been exemplifies above with reference to FIGS. 4 to 7. In the 802.11 standards, above focus was on radar, but RSSI, CSI, CIR and CFR based sensing is also possible, as is clear to those skilled in the art. Here, the above measurements are taken over a period of time and patterns are extracted corresponding to motions/objects in the environment. In this case, the mm-wave frequencies are more affected by motions/objects (because of propagation characteristics), therefore their measurements tend to have more peaks. Because of this, and pathloss, they are usually used by beamforming, thus making the channel more sparse and able to single out the desired peak patterns in the measurements. There is a change of range resolution with respect to bandwidth and carrier frequency, which may be considered when configuring the frame format and transmission parameters for a transmission signal.

It is noted that, for scenarios where Wi-Fi frame designs are not used, variations of joint sensing and communication waveforms (e.g. FIGS. 4 to 6) can be used depending on the data rate and sensing requirements. When Wi-Fi frame designs are being used, if there is no data to be transmitted and sensing requirements are not cm-level, then the legacy OFDM PPDU can be used. If there is no data to be transmitted, but the sensing requirements are more, then the 802.11ad frame design, or the HT/VHT/HE frame designs can be used with no data, and so on.

Embodiments of the present disclosure can be used in any kind of device that is used for wireless sensing. For instance, health monitoring, activity classification, gesture recognition, people counting, through the wall sensing, emotion recognition, attention monitoring, keystrokes recognition, drawing in the air, imaging, step counting, speed estimation, sleep detection, traffic monitoring, smoking detection, metal detection, sign language recognition, humidity estimation, wheat moisture detection, fruit ripeness detection, and/or sneeze sensing, etc. Besides these applications, the disclosure can be used in JSC technologies. This disclosure can also be used for sensing applications to support communication applications, like obstacle tracking for beam management. Therefore, devices that can utilize this disclosure could be smart homes/offices/cities/factories/etc. devices, like electrical kitchen appliances, TV sets, smart bus stops, smart office equipment (printers, etc.), lighting systems, WLAN and/or Wi-Fi devices, etc. Other devices could be stand-alone wireless sensors, such as heart-rate monitors, motion detectors, and/or smart watches, etc. The present disclosure is related to the aforementioned aspects of the Wi-Fi technology, and is also applicable to 3GPP (cellular) networks comprising above-mentioned 5G New Radio (NR) in its current or future releases other wireless communication standards.

In particular, (non-limiting) exemplary waveforms which may be selectable are

As mentioned above, the amendment 802.11bf—WLAN Sensing is working on standardization support for wireless sensing in WLAN networks. It is projected to be completed before the 802.11be—Extremely High Throughput (EHT) task group, which will form Wi-Fi 7 standards.

5G New Radio (NR) standard: The disclosure can be applied in 5G and beyond 5G because wireless sensing is envisioned to be a part of future cellular communication networks. This is especially the case for beyond 5G systems.

Communication technologies under the LTE/LTE Unlicensed (LTE-U) standards because LTE-U opportunistically uses WLAN operating bands.

Environment awareness, and therefore, wireless sensing, is an important part of CR. Therefore, the standards related to CR are relevant to this disclosure. The IEEE 802.22 and IEEE 802.15 standards are the standard supporting CR.

Low-power wide-area network (LPWAN) technologies, as it aids in increasing power efficiency through reducing the number of redundant sensing transmissions. Thus, it is related to LPWAN standards such as Wize, Zig Bee, NarrowBand IoT, and LoRaWAN.

This disclosure can be advantageously used at high frequencies. High frequencies allow increased resolution and sensitivity in wireless sensing applications, such as high-resolution wireless imaging Some Embodiments and Examples Summarizing, some embodiments in the present disclosure relate to facilitating coexistence of communication applications and sensing applications in at least partially overlapping bandwidths. In particular, a sensing device, a joint sensing and communication device and/or a communication device transmits a request for transmission resources to a scheduling device in a communication format compliant with a communication standard. In response, the scheduling device allocates resources corresponding to a frame format compliant with a communication standard according to which the communication device operates, if the request was for a communication application. On the other hand, the scheduling device allocates resources corresponding to a frame format compliant with the communication standard or to a frame format suitable for a sensing application, if the request was for the sensing application. The selection of the frame format for the sensing application may further depend on the priority of the sensing application or further features of the application or environment or channel or the like. The wireless device which receives the allocation schedules the signal transmission accordingly and may provide feedback to the scheduling device for adaptive frame format selection.

Figure 8B:
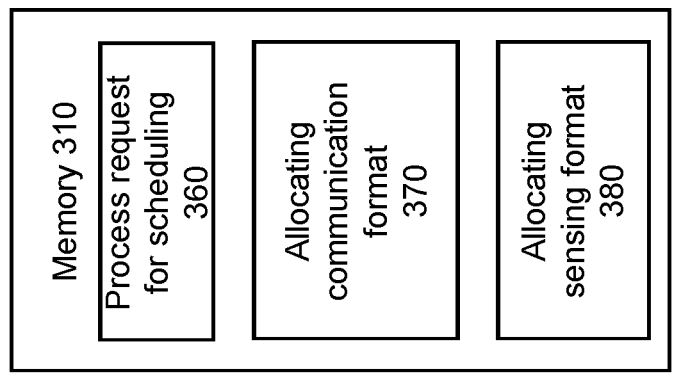
FIG. 8B is a block diagram illustrating an exemplary structure of a program memory scheduling device.
Figure 8A:
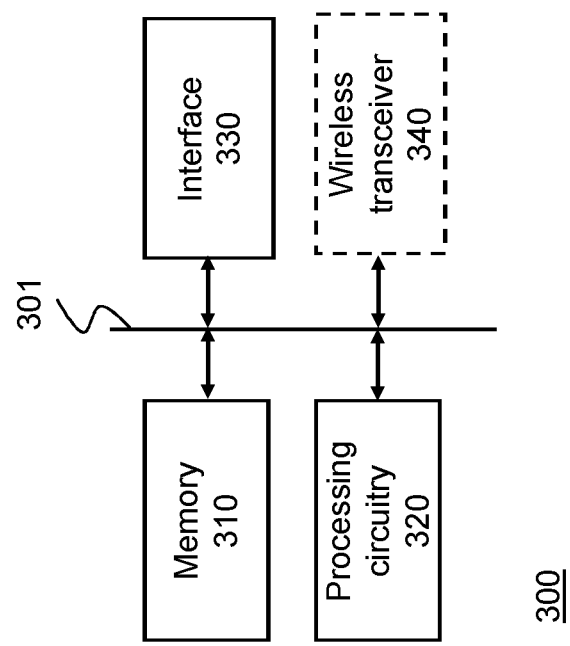
FIG. 8A is a block diagram illustrating an exemplary structure of a scheduling device or a wireless device.

FIG. 8A shows an exemplary device 300, which may implement some embodiments of the present disclosure. For example, the device may be the scheduling device or the wireless device. Such a device may comprise memory 300, processing circuitry 320, a wireless transceiver 340, and possibly a user interface 330. The device may be, for instance a (part of) a base station or a terminal/STA, or another device as mentioned above.

The memory 310 may store the program, which may be executed by the processing circuitry 320 to perform steps of any of the above and below mentioned methods. The processing circuitry may comprise one or more processors and/or other dedicated or programmable hardware. The wireless transceiver 340 may be configured to receive and/or transmit wireless signals (sensing, JSC, an/or communication). The transceiver 340 may comprise also baseband processing which may detect, decode and interpret the data or the sensing signal according to some standard or predefined convention. However, this is not necessary and devices with only sensing applications may implement only the lower one or two protocol layers. For example, the transceiver may be used to perform measurement, communicate with other devices such as base stations and/or terminals. The device 300 may further comprise a user interface 330 for displaying messages or status of the device, or the like and/or for receiving a user's input. A bus 301 interconnects the memory, the processing circuitry, the wireless transceiver, and the user interface.

FIG. 8B shows an example of the memory 310, comprising a module 360 for processing a scheduling request, a module 370 for the above mentioned communication format (or JSC format) scheduling and a module 380 for sensing format scheduling. The three steps 360, 370, and 380 may be controlling the transceiver 340 to adapt the wireless reception or transmission frame format for sensing or communication or JSC based on the sensing application. These modules 360-380 may be fetched from the memory and executed by the processing circuitry 320.

The above examples are not to limit the present disclosure. There are many modifications and configurations which may be used in addition or alternatively, as will be briefly described below.

According to an embodiment, a scheduling device (e.g. 300) is provided for scheduling transmission of a wireless signal, the scheduling device comprising: a receiver 340 for receiving, in a frame according to a first frame format of a communication standard, request for scheduling a transmission of a signal by a wireless device, the request comprising an indication of whether the signal is a communication signal or a sensing signal, control circuitry 320 configured to (e.g., by the program in memory 310): if the signal to be transmitted is a communication signal, allocate resources for transmission of the signal for a second frame format of a communication standard, and if the signal to be transmitted is a sensing signal, allocate resources for transmission of the signal for a third frame format which is different from the second format or for the second format, wherein a sensing bandwidth overlaps at least partially with the operation bandwidth of the communication standard.

According to an embodiment, a wireless device is provided for transmitting a wireless signal, the wireless device comprising: a transmitter for transmitting, in a frame according to a first frame format of a communication standard, request for scheduling a transmission of a signal to a scheduling device, the request comprising an indication of whether the signal is a communication signal or a sensing signal, a receiver for receiving, from a an allocation of resources which if the signal to be transmitted is a communication signal, allocates resources for transmission of the signal for a second frame format of a communication standard; and if the signal to be transmitted is a sensing signal, allocates resources for transmission of the signal for a third frame format which is different from the second format or for the second format, a control circuitry for controlling the transmitter to transmit the signal according to the received allocation within a bandwidth in which the operation bandwidth of the communication standard overlaps at least partially with the operation bandwidth of sensing.

It is noted that the devices described above, may provide functions described by any of the methods above and/or summarized in the following. This may be achieved by providing a software to control the processing circuitry accordingly, or by a combination of a software and hardware mentioned above with reference to FIGS. 8A and 8B.

Figure 9:
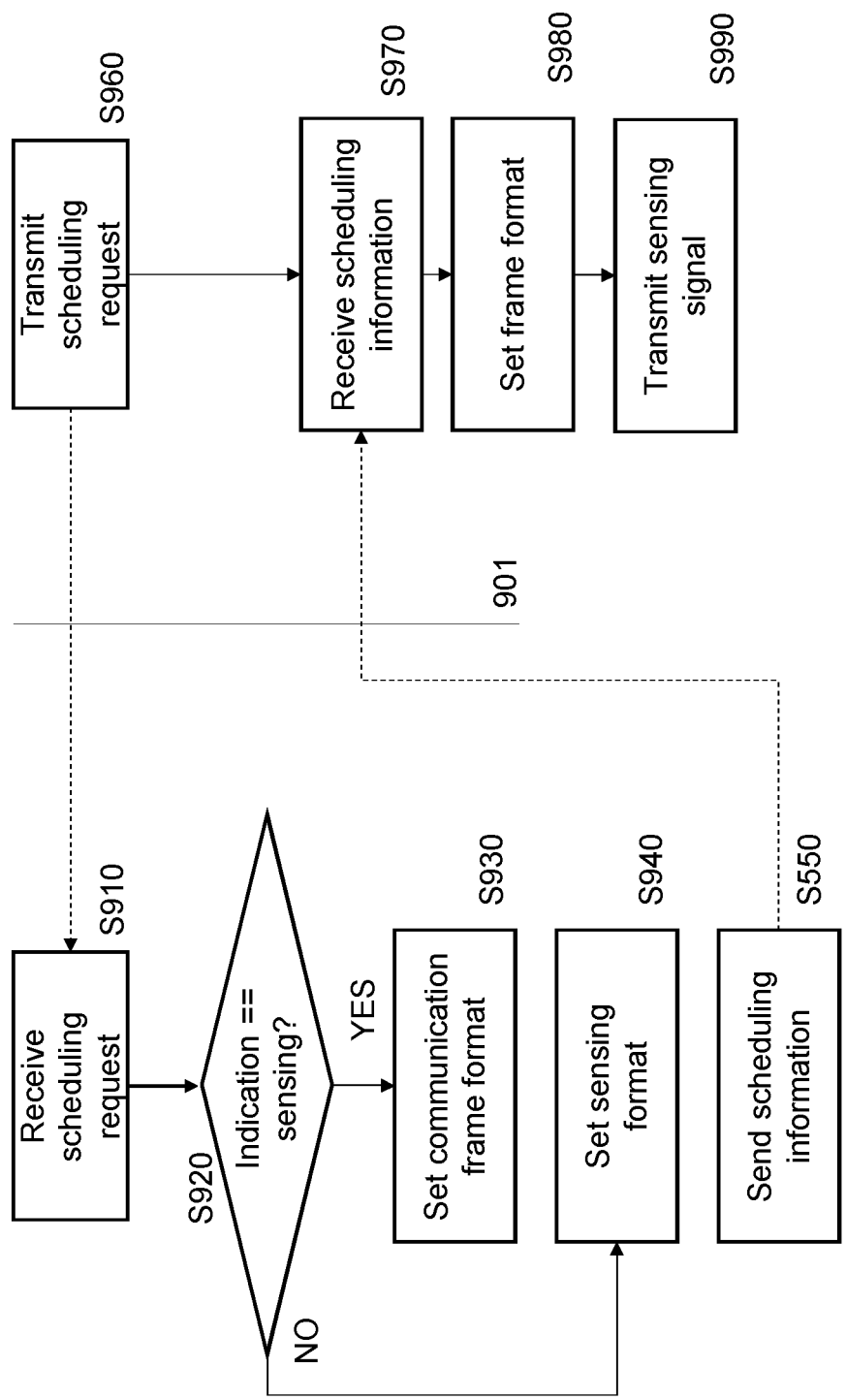
FIG. 9 is a flow diagram illustrating exemplary operation of the scheduling device and a wireless device.

FIG. 9 is a flow diagram illustrating a method. In particular, according to an embodiment, a method for scheduling transmission of a wireless signal, the method comprising: receiving S910, in a frame according to a first frame format of a communication standard, request for scheduling a transmission of a signal by a wireless device, the request comprising an indication of whether the signal is a communication signal (or a joint sensing and communication signal) or a sensing signal, if ("yes" in S920) the signal to be transmitted is a communication signal (or a JSC signal), allocating S930 resources for transmission of the signal for a second frame format of a communication standard, if ("yes" in S920) the signal to be transmitted is a sensing signal, allocating S940 resources for transmission of the signal for a third frame format which is different from the second format or for the second format, wherein a sensing signal bandwidth overlaps at least partially with the operation bandwidth of the communication standard. The scheduling device may then transmit S950 the scheduling information. Scheduling frame format for sensing applications an/or JSC applications adaptively, depending on the application may provide for better resource utilization in systems in which sensing and communication applications share the same bandwidth.

For example, the sensing signal is a continuous radar signal or a periodic radar signal.

In some exemplary implementations, the sensing signal is a signal generated by a sensing application out of wireless sensing, wireless local area sensing, non-invasive medical sensing, For instance, whether the resources for transmitting the sensing signal are allocated for the third frame format or for the second frame format depends on at least one of: a priority of the sensing signal, traffic load in the bandwidth, channel quality in the bandwidth, or spectrum occupancy.

In some exemplary implementations, the third format is determined from one or more of a plurality of predefined frame formats based on at least one of: a priority of the sensing signal, traffic load in the bandwidth, channel quality in the bandwidth, or spectrum occupancy.

The method in an exemplary implementation further comprises a step of determining a priority of the sensing signal to correspond to a priority of a sensing application, which generated the sensing signal, the determining comprises obtaining the priority of the sensing application based on at least one of: an identity of the device on which the sensing application is executed; an identity of the sensing application; or quality of service requirements of the sensing application.

For example, the determining of the priority is performed by a module trained based on machine learning.

The method, in some implementations, further comprises the step of: receiving feedback from the wireless device, the feedback being related to a quality of service requirements, priority, required resources, and/or channel quality.

For example, whether the resources for transmitting the sensing signal are allocated for the third frame format or for the second frame format, and/or the third frame format is determined based on the received feedback.

For example, the method as described above further comprises the step of determining one or more transmission parameters for the transmission of the signal based on the received feedback, wherein the transmission parameters comprise at least one of: transmission rate or repetition rate, carrier frequency, channel allocation, sensing sequence or waveform, characteristics of the environment, bandwidth, packet length or signal duration, beamforming parameters, numerology, cyclic prefix duration, or filtering or windowing parameters.

For example, the one or more transmission parameters comprise the characteristics of the environment and the characteristics of the environment are obtained at the wireless device by one or more out of: capturing an image of the environment and analyzing it with a module trained based on machine learning, and/or sensing the environment by a humidity, temperature and/or pressure sensor.

In any of the above mentioned embodiments and exemplary implementations, said allocating resources for the transmission of the signal may be performed according to requirements of a sensing application using said sensing signal. The requirements relate to at least one of bandwidth, beamwidth, sensing rate, or transmission power.

In addition, for example, the method may further comprise obtaining said requirements from said wireless device or based on information provided by said wireless device at a beginning of sensing session, and/or during a measurement session which is a part of said sensing session. In particular, such negotiation of requirements (operational parameters) may be mandatorily performed at the sensing session start. It may be optionally (e.g., initiated by the wireless device) performed during the sensing session.

FIG. 9 shows on its right hand side a wireless device method. The wireless device may be in communication with the scheduling device over a channel 901. According to an embodiment, a method is provided for transmitting a wireless signal, the method comprising: transmitting S960, in a frame according to a first frame format of a communication standard, request for scheduling a transmission of a signal to a scheduling device, the request comprising an indication of whether the signal is a communication signal or a sensing signal, receiving SS960, from a scheduling device an allocation of resources which if the signal to be transmitted is a communication signal, allocates resources for transmission of the signal for a second frame format of a communication standard; and if the signal to be transmitted is a sensing signal, allocates resources for transmission of the signal for a third frame format which is different from the second format or for the second format, transmitting S990 the signal according to the received allocation (which comprises setting the resources S980 as configured by the allocation) within a bandwidth in which the operation bandwidth of the communication standard overlaps at least partially with the operation bandwidth of sensing.

It is noted that the present disclosure is not limited to wireless devices selecting the frame format based on an external scheduling device. Rather, based on the sensing application to be performed, the wireless device may select and configure the frame structure adaptively, as described above. In such case, the scheduling request is not transmitted to an external scheduling device. Rather, an application run on a wireless device may request to be scheduled. There may be a plurality of sensing applications in the device.

In an exemplary implementation, the method further comprises transmitting feedback to a scheduling device, the feedback being related to a quality of service requirements, priority, required resources, and/or channel quality.

According to an embodiment, a scheduling device is provided for scheduling transmission of a wireless signal, the scheduling device comprising: a receiver for receiving, in a frame according to a first frame format of a communication standard, request for scheduling a transmission of a signal by a wireless device, the request comprising an indication of whether the signal is a communication signal or a sensing signal, control circuitry configured to: if the signal to be transmitted is a communication signal, allocate resources for transmission of the signal for a second frame format of a communication standard, and if the signal to be transmitted is a sensing signal, allocate resources for transmission of the signal for a third frame format which is different from the second format or for the second format, wherein a sensing bandwidth overlaps at least partially with the operation bandwidth of the communication standard.

According to an embodiments, a wireless device is provided for transmitting a wireless signal, the wireless device comprising: a transmitter for transmitting, in a frame according to a first frame format of a communication standard, request for scheduling a transmission of a signal to a scheduling device, the request comprising an indication of whether the signal is a communication signal or a sensing signal, a receiver for receiving, from a an allocation of resources which if the signal to be transmitted is a communication signal, allocates resources for transmission of the signal for a second frame format of a communication standard; and if the signal to be transmitted is a sensing signal, allocates resources for transmission of the signal for a third frame format which is different from the second format or for the second format, a control circuitry for controlling the transmitter to transmit the signal according to the received allocation within a bandwidth in which the operation bandwidth of the communication standard overlaps at least partially with the operation bandwidth of sensing.

Moreover, the corresponding methods are provided comprising steps performed by any of the above mentioned processing circuitry implementations.

Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit, IC.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

The invention claimed is:

1. A method for scheduling transmission of a wireless signal, comprising:
   receiving, in a frame according to a first frame format of a communication standard, a request for scheduling a transmission of a signal by a wireless device, the request comprising an indication of whether the signal is a communication signal or a sensing signal,
   if the signal to be transmitted is a communication signal, allocating resources for transmission of the signal for a second frame format of a communication standard,
   if the signal to be transmitted is a sensing signal, allocating resources for transmission of the signal for a third frame format which is different from the second format or for the second format,
   wherein a sensing signal bandwidth overlaps at least partially with the operation bandwidth of the communication standard,
   wherein whether the resources for transmitting the sensing signal are allocated for the third frame format or for the second frame format depends on at least one of: a priority of the sensing signal, traffic load in the bandwidth, channel quality in the bandwidth, or spectrum occupancy.

2. The method according to claim 1, wherein the sensing signal is a continuous or periodic radar signal.

3. The method according to claim 1, wherein the sensing signal is a signal generated by a sensing application selected from at least one of wireless sensing, wireless local area sensing, or non-invasive medical sensing.

4. The method according to claim 1, wherein the third format is determined from at least one of a plurality of predefined frame formats based on at least one of: a priority of the sensing signal, traffic load in the bandwidth, channel quality in the bandwidth, or spectrum occupancy.

5. The method according to claim 1,
   further comprising determining a priority of the sensing signal to correspond to a priority of a sensing application which generated the sensing signal, the determining comprising obtaining the priority of the sensing application based on at least one of:
      an identity of the device on which the sensing application is executed;
      an identity of the sensing application; or
      quality of service requirements of the sensing application.

6. The method according to claim 5, wherein the determining of the priority is performed by a model trained based on machine learning.

7. The method according to claim 1, further comprising:
   receiving feedback from the wireless device, the feedback being related to a quality of service requirements, priority, required resources, and/or channel quality.

8. The method according to claim 7, wherein:
   whether the resources for transmitting the sensing signal are allocated for the third frame format or for the second frame format, and/or
   the third frame format
   is determined based on the received feedback.

9. The method according to claim 7, further comprising determining one or more transmission parameters for the transmission of the signal based on the received feedback,
   wherein the transmission parameters comprise at least one of: transmission rate or repetition rate, carrier frequency, channel allocation, sensing sequence or waveform, characteristics of the environment, bandwidth, packet length or signal duration, beamforming parameters, numerology, cyclic prefix duration, or filtering or windowing parameters.

10. The method according to claim 9, wherein the one or more transmission parameters comprise the characteristics of the environment and the characteristics of the environment are obtained at the wireless device by at least one of:
    capturing an image of the environment and analyzing it with a model trained based on machine learning, or
    sensing the environment by a humidity, temperature and/or pressure sensor.

11. The method according to claim 1, wherein
    the allocating resources for the transmission of the signal is performed according to requirements of a sensing application using the sensing signal,
    the requirements relate to at least one of bandwidth, beamwidth, sensing rate, or transmission power.

12. The method according to claim 1, further comprising obtaining the requirements from the wireless device or based on information provided by the wireless device at a beginning of sensing session, and/or during a measurement session which is a part of the sensing session.

13. A method for transmitting a wireless signal, comprising:
    transmitting, in a frame according to a first frame format of a communication standard, a request for scheduling a transmission of a signal to a scheduling device, the request comprising an indication of whether the signal is a communication signal or a sensing signal,
    receiving, from the scheduling device, an allocation of resources which if the signal to be transmitted is a communication signal, allocates resources for transmission of the signal for a second frame format of a communication standard; and if the signal to be transmitted is a sensing signal, allocates resources for transmission of the signal for a third frame format which is different from the second format or for the second format, wherein whether the resources for transmitting the sensing signal are allocated for the third frame format or for the second frame format depends on at least one of: a priority of the sensing signal, traffic load in the bandwidth, channel quality in the bandwidth, or spectrum occupancy, transmitting the signal according to the received allocation within a bandwidth in which the operation bandwidth of the communication standard overlaps at least partially with the operation bandwidth of sensing.

14. The method according to claim 13, further comprising transmitting feedback to a scheduling device, the feedback being related to quality of service requirements, priority, required resources, and/or channel quality.

15. A scheduling device for scheduling transmission of a wireless signal, comprising:
- a receiver for receiving, in a frame according to a first frame format of a communication standard, a request for scheduling a transmission of a signal by a wireless device, the request comprising an indication of whether the signal is a communication signal or a sensing signal,
- control circuitry configured to:
  - if the signal to be transmitted is a communication signal, allocate resources for transmission of the signal for a second frame format of a communication standard, and
  - if the signal to be transmitted is a sensing signal, allocate resources for transmission of the signal for a third frame format which is different from the second format or for the second format,
- wherein a sensing bandwidth overlaps at least partially with the operation bandwidth of the communication standard,
- wherein whether the resources for transmitting the sensing signal are allocated for the third frame format or for the second frame format depends on at least one of: a priority of the sensing signal, traffic load in the bandwidth, channel quality in the bandwidth, or spectrum occupancy.

16. A wireless device for transmitting a wireless signal, the wireless device comprising:
- a transmitter for transmitting, in a frame according to a first frame format of a communication standard, request for scheduling a transmission of a signal to a scheduling device, the request comprising an indication of whether the signal is a communication signal or a sensing signal,
- a receiver for receiving, from the scheduling device, an allocation of resources which if the signal to be transmitted is a communication signal, allocates resources for transmission of the signal for a second frame format of a communication standard; and if the signal to be transmitted is a sensing signal, allocates resources for transmission of the signal for a third frame format which is different from the second format or for the second format, wherein whether the resources for transmitting the sensing signal are allocated for the third frame format or for the second frame format depends on at least one of: a priority of the sensing signal, traffic load in the bandwidth, channel quality in the bandwidth, or spectrum occupancy,
- a control circuitry for controlling the transmitter to transmit the signal according to the received allocation within a bandwidth in which the operation bandwidth of the communication standard overlaps at least partially with the operation bandwidth of sensing.

* * * * *